US012787922B2

(12) United States Patent
Coates

(10) Patent No.: US 12,787,922 B2
(45) Date of Patent: Nov. 10, 2026

(54) FLOATING ACTUATOR FOR MOWER DECK

(71) Applicant: Textron Inc., Providence, RI (US)

(72) Inventor: Carwyn Coates, Wickwar (GB)

(73) Assignee: TEXTRON INC., Providence, RI (US)

( * ) Notice: Subject to any disclaimer, the term of this patent is extended or adjusted under 35 U.S.C. 154(b) by 380 days.

(21) Appl. No.: 18/584,632

(22) Filed: Feb. 22, 2024

(65) Prior Publication Data

US 2025/0268133 A1 Aug. 28, 2025

(51) Int. Cl.

| | |
|---|---|
| ***A01D 34/74*** | (2006.01) |
| ***A01D 69/02*** | (2006.01) |
| *A01D 101/00* | (2006.01) |

(52) U.S. Cl.

CPC ............. *A01D 34/74* (2013.01); *A01D 69/02* (2013.01); *A01D 2101/00* (2013.01)

(58) Field of Classification Search

CPC ........ A01D 34/64; A01D 34/74; A01D 69/02; F16B 2/04; F16B 2/06; F16B 2/065; F15B 15/28; F15B 15/2861; F15B 15/149; F15B 15/1476; F15B 15/1433; F15B 15/1447; F16H 25/20; F16H 25/2015; F16H 25/2021; F16H 25/2081; H02K 7/06; B60G 17/015

See application file for complete search history.

(56) References Cited

U.S. PATENT DOCUMENTS 4,064,981 A 12/1977 House et al.
4,137,784 A 2/1979 Griffin
4,179,944 A 12/1979 Conner
4,289,996 A 9/1981 Barnes
4,307,799 A 12/1981 Zouzoulas
4,635,491 A 1/1987 Yamano et al.
4,637,272 A 1/1987 Teske et al.
4,712,441 A 12/1987 Abraham
4,745,815 A 5/1988 Klopfenstein
4,858,481 A 8/1989 Abraham
5,121,019 A 6/1992 Pradler
5,187,993 A 2/1993 Nicholson et al.
5,319,991 A 6/1994 Pierrat
5,491,372 A 2/1996 Erhart
5,557,154 A 9/1996 Erhart
(Continued)

FOREIGN PATENT DOCUMENTS

AU 2010100158 A4 3/2010
AU 2008200354 B2 11/2012
(Continued)

*Primary Examiner* — Robert E Pezzuto
(74) *Attorney, Agent, or Firm* — Foley & Lardner LLP

(57) ABSTRACT

A mower includes a chassis, a tractive element coupled to the chassis, a mower deck coupled to the chassis and including a cutting element, and a deck actuator assembly configured to raise the mower deck relative to the chassis. The deck actuator assembly includes a frame, a first actuator shaft coupled to the mower deck and slidably coupled to the frame, a second actuator shaft coupled to the chassis and slidably coupled to the frame, a stop slidably coupled to the first actuator shaft and configured to (a) limit movement of the first actuator shaft in a first direction and (b) permit movement of the first actuator shaft in a second direction opposite the first direction, and an actuator configured to reposition the stop relative to the frame.

20 Claims, 23 Drawing Sheets

(56) References Cited

U.S. PATENT DOCUMENTS

| | | | |
|---|---|---|---|
| 5,816,033 | A | 10/1998 | Busboom et al. |
| 6,253,632 | B1 | 7/2001 | Poulek |
| 7,389,709 | B2 | 6/2008 | Zhou |
| 7,578,117 | B2 | 8/2009 | Shaffer |
| 7,730,705 | B2 | 6/2010 | Kubinski |
| 8,794,085 | B2 | 8/2014 | Balducci et al. |
| 9,587,725 | B2 | 3/2017 | Wingett et al. |
| 10,024,406 | B2 | 7/2018 | Stensgaard |
| 10,066,715 | B2 | 9/2018 | Larson et al. |
| 11,006,574 | B1 | 5/2021 | Nichols et al. |
| 12,653,098 | B2 | 6/2026 | Hall |
| 2001/0029797 | A1 | 10/2001 | Lange et al. |
| 2002/0134180 | A1 | 9/2002 | Gorin et al. |
| 2003/0015046 | A1 | 1/2003 | Dzurko et al. |
| 2004/0000823 | A1 | 1/2004 | Patridge |
| 2005/0252318 | A1 | 11/2005 | Corney |
| 2008/0190087 | A1 | 8/2008 | Elhardt et al. |
| 2009/0173052 | A1 | 7/2009 | Swart |
| 2020/0120866 | A1 | 4/2020 | Conrad et al. |
| 2020/0191175 | A1 | 6/2020 | Thorsell |
| 2020/0260639 | A1 | 8/2020 | Walker |
| 2022/0117154 | A1* | 4/2022 | Steen .................... B60B 33/066 |
| 2022/0221034 | A1* | 7/2022 | Wu ......................... F16H 25/20 |
| 2022/0312672 | A1 | 10/2022 | Kowalewski et al. |

FOREIGN PATENT DOCUMENTS

| | | | |
|---|---|---|---|
| CA | 1139967 | A | 1/1983 |
| CA | 1148767 | A | 6/1983 |
| CA | 2168333 | A1 | 2/1995 |
| CA | 2529534 | A1 | 6/2007 |
| CA | 2529629 | A1 | 6/2007 |
| CN | 214221936 | U | 9/2021 |
| CZ | 28238 | U1 | 5/2015 |
| CZ | 34249 | U1 | 7/2020 |
| DE | 42 15 964 | A1 | 11/1992 |
| DE | 10 2009 028 568 | B4 | 2/2011 |
| EP | 0 577 541 | B1 | 1/1994 |
| EP | 0 601 185 | B1 | 6/1994 |
| EP | 1 927 543 | B1 | 6/2008 |
| EP | 2 356 923 | B1 | 8/2011 |
| FI | 101416 | B | 6/1998 |
| GB | 2 185 731 | A | 7/1987 |
| IN | 309267 | B | 3/2019 |
| JP | H979298 | A | 3/1997 |
| JP | H10-148246 | A | 6/1998 |
| KR | 930004106 | B1 | 5/1993 |
| RO | 122846 | B1 | 3/2010 |
| SU | 671936 | A1 | 7/1979 |
| SU | 1747780 | A1 | 7/1992 |
| WO | WO-2011/096913 | A1 | 8/2011 |

* cited by examiner

FLOATING ACTUATOR FOR MOWER DECK

BACKGROUND

The present disclosure relates generally to mowers. More specifically, the present disclosure relates to an actuator for a deck of a mower.

Mowers are used to maintain vegetation (e.g., grass, clover, weeds, etc.) at a desired height. To accomplish this, mowers include at least one mower deck having a cutting element that is driven by a motor. A cutting height of the mower deck may be set by an operator to provide a desired trimmed height of the vegetation. When traveling at high speeds (e.g., between jobsites), a user may raise the mower deck to avoid contact between the mower deck and the ground. The height of the mower deck may be set by a mower deck actuator.

SUMMARY

One embodiment relates to a mower. The mower includes a chassis, a tractive element coupled to the chassis, a mower deck coupled to the chassis and including a cutting element, and a deck actuator assembly configured to raise the mower deck relative to the chassis. The deck actuator assembly includes a frame, a first actuator shaft coupled to the mower deck and slidably coupled to the frame, a second actuator shaft coupled to the chassis and slidably coupled to the frame, a stop slidably coupled to the first actuator shaft and configured to (a) limit movement of the first actuator shaft in a first direction and (b) permit movement of the first actuator shaft in a second direction opposite the first direction, and an actuator configured to reposition the stop relative to the frame.

Another embodiment relates to a mower. The mower includes a chassis, a mower deck coupled to the chassis and including a cutting element, and a deck actuator assembly configured to raise the mower deck relative to the chassis. The deck actuator assembly includes an output interface coupled to the chassis, a frame coupled to the output interface, an actuator shaft coupled to the mower deck and slidably coupled to the frame, a control stop positioned to (a) limit movement of the actuator shaft in a first longitudinal direction and (b) permit movement of the actuator shaft in a second longitudinal direction opposite the first longitudinal direction, a rotating member rotatably coupled to the frame, and a link rotatably coupled to the control stop and the rotating member. Rotation of the rotating member causes a corresponding longitudinal movement of the control stop.

Still another embodiment relates to a floating linear actuator. The floating linear actuator includes a frame defining a first shaft passage and a second shaft passage, a first actuator shaft extending through the first shaft passage, a second actuator shaft extending through the second shaft passage, a first control stop movable relative to the frame and the first actuator shaft, a second control stop movable relative to the frame and the second actuator shaft, and a linkage. The linkage includes a rotating member rotatably coupled to the frame, a first link coupling the first control stop to the rotating member, and a second link coupling the second control stop to the rotating member. Rotation of the rotating member both (a) repositions the first control stop relative to the frame to limit a longitudinal range of motion of the first actuator shaft and (b) repositions the second control stop relative to the frame to limit a longitudinal range of motion of the second actuator shaft.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

According to an exemplary embodiment, a mower of the present disclosure includes a chassis, a mower deck including a cutting element, and a deck actuator that controls a height of the mower deck relative to the chassis. During normal operation, the mower deck uses the cutting element to trim vegetation (e.g., grass, clover, weeds, etc.). A user may use the deck actuator to set a cutting height of the mower deck or to raise the mower deck to a travel position (e.g., a height where the mower deck is out of contact with the vegetation). When the mower deck is at a cutting height and the mower passes over an obstacle (e.g., an incline or decline in the ground surface, and object, etc.), the mower deck may be forced upward. The deck actuator is a floating actuator that prevents downward movement of the mower deck below the set height but permits free upward movement of the mower deck. Accordingly, the deck actuator permits the mower deck to quickly rise over the obstacle and return back to the set height without damage to any components or a gap in the cutting operation. Other mowers use deck actuators lacking this floating capability. Upon encountering an obstacle, these actuators resist the upward movement of the mower deck, producing stresses within the deck actuator and potentially causing a delay in the cutting operation.

Overall Vehicle

Figure 1:
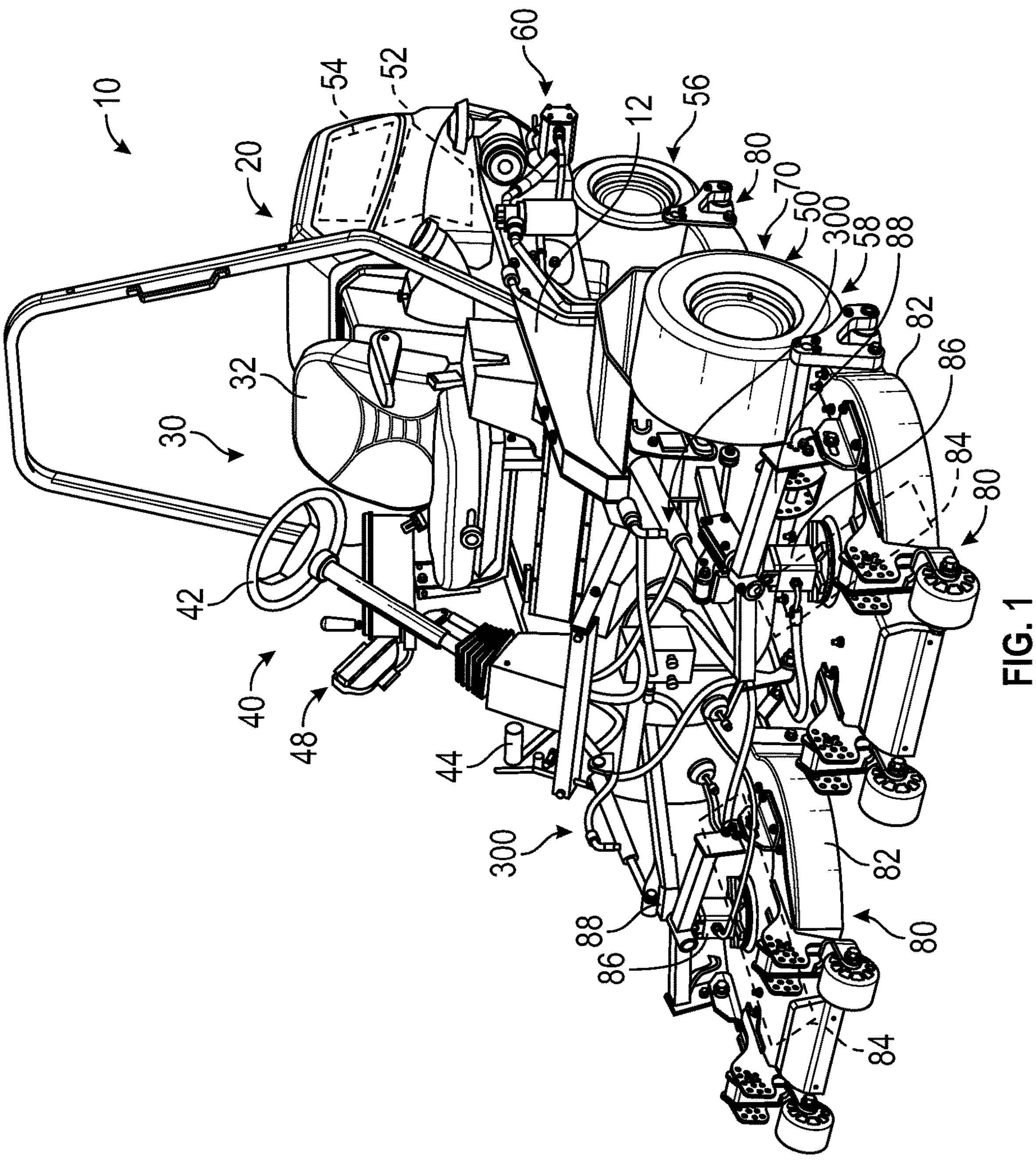
FIG. 1 is a perspective view of a mower, according to an exemplary embodiment.
Figure 2:
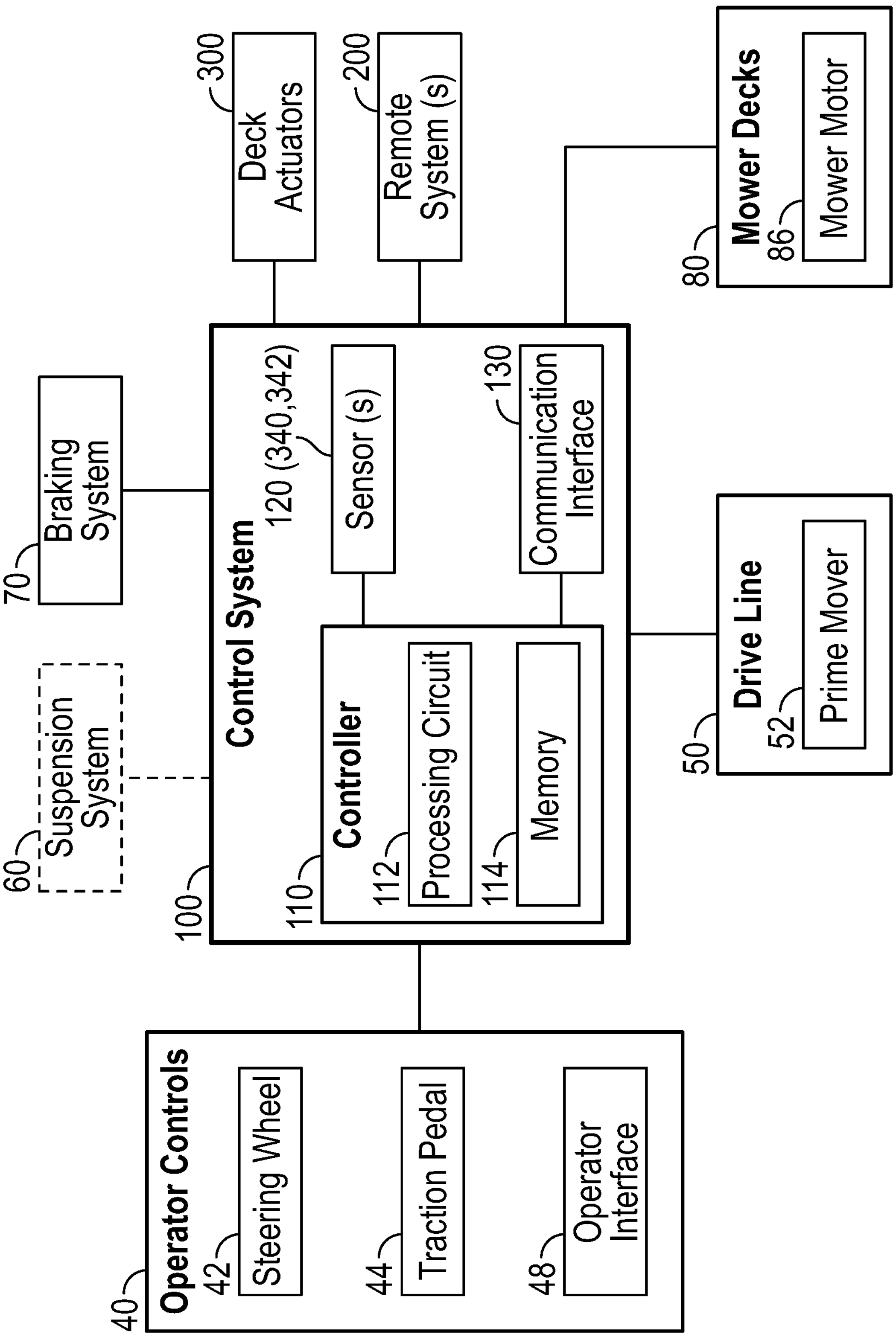
FIG. 2 is a schematic block diagram of the mower of FIG. 1, according to an exemplary embodiment.

As shown in FIGS. 1 and 2, a machine or vehicle, shown as mower 10, includes a chassis, shown as frame 12; a body assembly, shown as body 20, coupled to the frame 12 and having an occupant portion or section, shown as occupant seating area 30; operator input and output devices, shown as operator controls 40, that are disposed within the occupant seating area 30; a drivetrain, shown as driveline 50, coupled to the frame 12 and at least partially disposed under the body 20; a vehicle suspension system, shown as suspension system 60, coupled to the frame 12 and one or more components of the driveline 50; a vehicle braking system, shown as braking system 70, coupled to one or more components of the driveline 50 to facilitate selectively braking the one or more components of the driveline 50; and a vehicle control system, shown as control system 100, coupled to the operator controls 40, the driveline 50, the suspension system 60, the braking system 70, and/or one or more external devices or systems positioned remote from the mower 10, shown as remote system(s) 200. The mower 10 further includes a series of implements or mower assemblies, shown as mower decks 80. In other embodiments, the mower 10 includes more or fewer components.

According to an exemplary embodiment, the mower 10 is an off-road machine or vehicle. In some embodiments, the mower 10 is a lawnmower, a turf mower, a push mower, a ride-on mower, a stand-on mower, or another type of mower. In other embodiments, the off-road machine or vehicle is a lightweight or recreational machine or vehicle such as a golf cart, an all-terrain vehicle ("ATV"), a utility task vehicle ("UTV"), and/or another type of lightweight or recreational machine or vehicle. In some embodiments, the off-road machine or vehicle is a chore product such as aerator, turf sprayer, bunker rake, and/or another type of chore product (e.g., that may be used on a golf course).

According to the exemplary embodiment shown in FIG. 1, the occupant seating area 30 includes a single seat, shown as driver seat 32. In some embodiments, the occupant seating area 30 includes additional seats (e.g., a passenger seat, an additional row of seats, etc.). According to the exemplary embodiment shown in FIG. 1, the driver seat 32 is laterally centered on the body 20 and facing forward. In some embodiments, the driver seat 32 is facing rearward or otherwise positioned. In some embodiments, the occupant seating area 30 is omitted (e.g., the mower 10 is configured as a push mower).

According to an exemplary embodiment, the operator controls 40 are configured to provide an operator with the ability to control one or more functions of and/or provide commands to the mower 10 and the components thereof (e.g., turn on, turn off, drive, turn, brake, engage various operating modes, raise/lower a mower deck 80, etc.). As shown in FIGS. 1 and 2, the operator controls 40 include a steering interface (e.g., a steering wheel, joystick(s), etc.), shown steering wheel 42, an accelerator interface and/or braking interface (e.g., a pedal, a throttle, etc.), shown as traction pedal 44, and one or more additional interfaces, shown as operator interface 48. The traction pedal 44 may be used to control the speed and direction of travel of the mower 10. By way of example, pressing the traction pedal 44 in a first direction may cause the driveline 50 to move the mower 10 forward, and pressing the traction pedal 44 in an opposing section direction may cause the driveline 50 to move the mower 10 rearward. Returning the traction pedal 44 to a middle or neutral position may cause the braking system 70 and/or the driveline 50 to slow or stop the mower 10 or to hold the mower 10 in place. Alternatively, the operator interface 48 may include a pair of handles that control the driveline 50 in a zero-turn configuration (e.g., a left joystick to control the left side of the driveline 50 and a right joystick to control a right side of the driveline 50). The operator interface 48 may be used to control operation of the mower decks 80 (e.g., changing a cutting speed of a mower deck 80, changing a cutting height of a mower deck 80, etc.). The operator interface 48 may include one or more displays and one or more input devices. The one or more displays may be or include a touchscreen, an LCD display, a LED display, a speedometer, gauges, warning lights, etc. The one or more input device may be or include buttons, switches, knobs, levers, dials, etc.

According to an exemplary embodiment, the driveline 50 is configured to propel the mower 10. As shown in FIGS. 1 and 2, the driveline 50 includes a primary driver, shown as prime mover 52, an energy storage device, shown as energy storage 54, a first tractive assembly (e.g., axles, wheels, tracks, differentials, etc.), shown as rear tractive assembly 56, and a second tractive assembly (e.g., axles, wheels, tracks, differentials, etc.), shown as front tractive assembly 58. In some embodiments, the driveline 50 is a conventional driveline whereby the prime mover 52 is an internal combustion engine and the energy storage 54 is a fuel tank. The internal combustion engine may be a spark-ignition internal combustion engine or a compression-ignition internal combustion engine that may use any suitable fuel type (e.g., diesel, ethanol, gasoline, natural gas, propane, etc.). In some embodiments, the driveline 50 is an electric driveline whereby the prime mover 52 is one or more electric motors and the energy storage 54 is a battery system. In some embodiments, the driveline 50 is a fuel cell electric driveline whereby the prime mover 52 is one or more electric motors and the energy storage 54 is a fuel cell (e.g., that stores hydrogen, that produces electricity from the hydrogen, etc.). In some embodiments, the driveline 50 is a hybrid driveline whereby (i) the prime mover 52 includes an internal combustion engine and an electric motor/generator and (ii) the energy storage 54 includes a fuel tank and/or a battery system. According to the exemplary embodiment shown in FIG. 1, the rear tractive assembly 56 includes rear tractive elements and the front tractive assembly 58 includes front tractive elements that are configured as wheels. In some embodiments, the rear tractive elements and/or the front tractive elements are configured as tracks. In some embodiments, the driveline 50 is omitted, and the mower 10 is propelled by an operator (e.g., the mower 10 is configured as a push mower).

According to an exemplary embodiment, the prime mover 52 is configured to provide power to drive the rear tractive assembly 56 and/or the front tractive assembly 58 (e.g., to provide front-wheel drive, rear-wheel drive, four-wheel drive, and/or all-wheel drive operations). In some embodiments, the driveline 50 includes a transmission device (e.g., a gearbox, a continuous variable transmission ("CVT"), etc.)

positioned between (a) the prime mover 52 and (b) the rear tractive assembly 56 and/or the front tractive assembly 58. The rear tractive assembly 56 and/or the front tractive assembly 58 may include a drive shaft, a differential, and/or an axle. In some embodiments, the rear tractive assembly 56 and/or the front tractive assembly 58 include two axles or a tandem axle arrangement. In some embodiments, the rear tractive assembly 56 and/or the front tractive assembly 58 are steerable (e.g., using the steering wheel 42). In some embodiments, both the rear tractive assembly 56 and the front tractive assembly 58 are fixed and not steerable (e.g., employ skid steer operations). By way of example, the driveline 50 may include a hydrostatic transmission that permits independent driving of the left and right sides of the driveline 50.

In some embodiments, the driveline 50 includes a plurality of prime movers 52. By way of example, the driveline 50 may include a first prime mover 52 that drives the rear tractive assembly 56 and a second prime mover 52 that drives the front tractive assembly 58. By way of another example, the driveline 50 may include a first prime mover 52 that drives a first one of the front tractive elements, a second prime mover 52 that drives a second one of the front tractive elements, a third prime mover 52 that drives a first one of the rear tractive elements, and/or a fourth prime mover 52 that drives a second one of the rear tractive elements. By way of still another example, the driveline 50 may include a first prime mover 52 that drives the front tractive assembly 58, a second prime mover 52 that drives a first one of the rear tractive elements, and a third prime mover 52 that drives a second one of the rear tractive elements. By way of yet another example, the driveline 50 may include a first prime mover 52 that drives the rear tractive assembly 56, a second prime mover 52 that drives a first one of the front tractive elements, and a third prime mover 52 that drives a second one of the front tractive elements.

According to an exemplary embodiment, the suspension system 60 includes one or more suspension components (e.g., shocks, dampers, springs, etc.) positioned between the frame 12 and one or more components (e.g., tractive elements, axles, etc.) of the rear tractive assembly 56 and/or the front tractive assembly 58. In some embodiments, the mower 10 does not include the suspension system 60.

According to an exemplary embodiment, the braking system 70 includes one or more braking components (e.g., disc brakes, drum brakes, in-board brakes, axle brakes, etc.) positioned to facilitate selectively braking one or more components of the driveline 50. In some embodiments, the one or more braking components include (i) one or more front braking components positioned to facilitate braking one or more components of the front tractive assembly 58 (e.g., the front axle, the front tractive elements, etc.) and (ii) one or more rear braking components positioned to facilitate braking one or more components of the rear tractive assembly 56 (e.g., the rear axle, the rear tractive elements, etc.). In some embodiments, the one or more braking components include only the one or more front braking components. In some embodiments, the one or more braking components include only the one or more rear braking components. In some embodiments, the one or more front braking components include two front braking components, one positioned to facilitate braking each of the front tractive elements. In some embodiments, the one or more rear braking components include two rear braking components, one positioned to facilitate braking each of the rear tractive elements. In some embodiments, the driveline 50 is a hydrostatic transmission that performs braking by using hydraulic motors to oppose movement of the tractive elements.

As shown in FIG. 2, the control system 100 includes a controller 110, one or more sensors 120, and a communications interface 130 (e.g., located on the mower 10). In some embodiments, the control system includes the remote systems(s) 200. In one embodiment, the controller 110 is configured to selectively engage, selectively disengage, control, or otherwise communicate with components of the mower 10. According to an exemplary embodiment, the controller 110 is coupled to (e.g., communicably coupled to) components of the operator controls 40 (e.g., the steering wheel 42, the traction pedal 44, the operator interface 48, etc.), components of the driveline 50 (e.g., the prime mover 52), components of the braking system 70, the sensors 120, the communications interface 130, and the remote system(s) 200. By way of example, the controller 110 may send and receive signals (e.g., control signals, location signals, etc.) with the components of the operator controls 40, the components of the driveline 50, the components of the braking system 70, the sensors 120, the communications interface 130, and/or the remote system(s) 200.

The controller 110 may be implemented as a general-purpose processor, an application specific integrated circuit ("ASIC"), one or more field programmable gate arrays ("FPGAs"), a digital-signal-processor ("DSP"), circuits containing one or more processing components, circuitry for supporting a microprocessor, a group of processing components, or other suitable electronic processing components. According to the exemplary embodiment shown in FIG. 2, the controller 110 includes a processing circuit 112 and a memory 114. The processing circuit 112 may include an ASIC, one or more FPGAs, a DSP, circuits containing one or more processing components, circuitry for supporting a microprocessor, a group of processing components, or other suitable electronic processing components. In some embodiments, the processing circuit 112 is configured to execute computer code stored in the memory 114 to facilitate the activities described herein. The memory 114 may be any volatile or non-volatile or non-transitory computer-readable storage medium capable of storing data or computer code relating to the activities described herein. According to an exemplary embodiment, the memory 114 includes computer code modules (e.g., executable code, object code, source code, script code, machine code, etc.) configured for execution by the processing circuit 112. In some embodiments, the controller 110 may represent a collection of processing devices. In such cases, the processing circuit 112 represents the collective processors of the devices, and the memory 114 represents the collective storage devices of the devices.

The sensors 120 may include various sensors positioned about the mower 10 to acquire information or data regarding operation of the mower 10 and/or the location thereof. By way of example, the sensors 120 may include an accelerometer, a gyroscope, a compass, a position sensor (e.g., a GPS sensor, etc.), suspension sensor(s), wheel sensors, an audio sensor or microphone, and/or other sensors to facilitate acquiring information or data regarding operation of the mower 10 and/or the location thereof. According to an exemplary embodiment, one or more of the sensors 120 are configured to facilitate detecting and obtaining vehicle telemetry data including position of the mower 10, whether the mower 10 is moving, travel direction of the mower 10, slope of the mower 10, speed of the mower 10, vibrations experienced by the mower 10, sounds proximate the mower 10, suspension travel of components of the suspension system 60, and/or other vehicle telemetry data.

The communications interface 130 may be configured to facilitate wireless communications with the remote system(s) 200. By way of example, the communications interface 130 may be configured to employ one or more types of wireless communications protocols including Bluetooth, Wi-Fi, radio, cellular, and/or other suitable wireless communications protocols.

The remote systems 200 may be or include an off-site server-based system that monitors various global positioning system ("GPS") information and/or real-time kinematics ("RTK") information (e.g., position/location, speed, direction of travel, geofence related information, etc.) and provides GPS data and/or RTK data based on the GPS information and/or RTK information to the controller 110 of the mower 10 through the communications interface 130. The remote systems 200 may additionally or alternatively be or include an on-site system (e.g., in a club house of a golf course, on the golf course, etc.) that communicates with the mower 10 via the communications interface 130. The on-site system may collect data from the mower 10 that may be used by the operators of the site (e.g., for advanced scheduling purposes, to identify persons braking course guidelines or rules, etc.). The on-site system may also function as an intermediary between the mower 10 and the off-site server-based system (e.g., if the communications interface 130 does not have long-range wireless communications capabilities). In some embodiments, the remote system(s) 200 include a processing circuit, a memory, and a communications interface similar to the control system 100. In some embodiments (e.g., when the remote system(s) 200 are part of the control system 100), the control system 100 includes a plurality of processing circuits 112 (e.g., a first processing circuit for the controller 110 of the vehicle 10 and a second processing circuit for the remote system(s) 200) and a plurality of memories 114 (e.g., a first memory for the controller 110 of the vehicle 10 and a second memory for the remote system (s) 200).

Mower Deck Actuators

Referring to FIG. 1, the mower 10 includes a series of mower decks 80. Each mower deck 80 includes a deck, housing, or enclosure, shown as housing 82, and a cutting element 84 (e.g., a blade, a flail, a reel, etc.) movably coupled to the housing 82. The housing 82 may open downward to expose the cutting element 84 to vegetation below the housing 82. A motor or actuator (e.g., an electric motor, a hydraulic motor, etc.), shown as mower motor 86, is coupled to the housing 82 and drives movement (e.g., rotation, oscillation, etc.) of the cutting element 84. While driven by the mower motor 86, the cutting element 84 crushes, mulches, removes, or otherwise trims vegetation beneath the housing 82. Alternatively, the cutting element 84 may be driven by the prime mover 52 (e.g., through a power take off).

Figure 3:
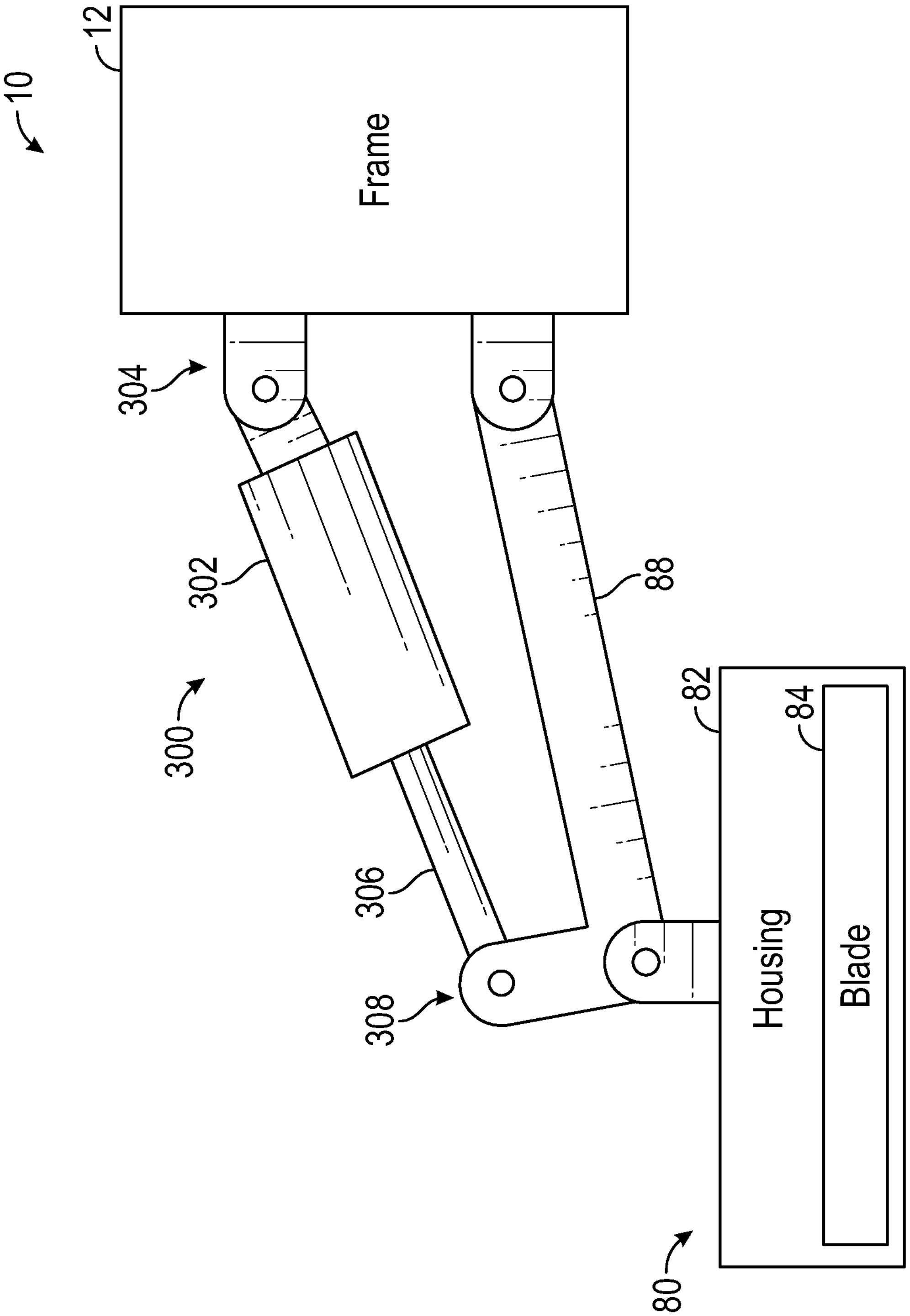
FIG. 3 is a side view of a connection between a mower deck and a frame of the mower of FIG. 1, according to an exemplary embodiment.

FIG. 3 illustrates a connection between a mower deck 80 and the frame 12. The mower deck 80 of FIG. 3 may represent any of the mower decks 80 of FIG. 1. A linkage or connection, shown as deck support 88, extends between the housing 82 and the frame 12. A first end portion of the deck support 88 is pivotally coupled to the housing 82, and a second end portion of the deck support 88 is pivotally coupled to the frame 12. A mower deck actuator (e.g., a floating actuator or linear actuator), shown as deck actuator 300, extends between the frame 12 and the deck support 88. A first portion or upper portion of the deck actuator 300, shown as control section 302, defines a connection interface or first end portion 304 of the deck actuator 300 that is pivotally coupled to the frame 12. A second portion or lower portion of the deck actuator 300, shown as floating section 306, defines a connection interface or second end portion 308 of the deck actuator 300 that is pivotally coupled to the deck support 88. The deck actuator 300 extends longitudinally from the first end portion 304 to the second end portion 308. Accordingly, the mower deck 80 is indirectly coupled to the deck actuator 300 and the frame 12 through the deck support 88.

The deck actuator 300 is operatively coupled to (e.g., controlled by) the controller 110. The deck actuator 300 permits control over a length of the deck actuator 300 (e.g., a distance between the first end portion 304 and the second end portion 308). By varying a length of the deck actuator 300, the control system 100 controls a height of the mower deck 80 relative to the frame 12. The deck actuator 300 may set a cutting height of the mower deck 80. The cutting height represents a final height of vegetation that is trimmed by the mower deck 80. The deck actuator 300 may move the mower deck 80 to a travel position above the cutting height, in which the mower deck 80 is moved out of engagement with the vegetation and the ground surface. The travel position may be used when the mower 10 is traveling between job sites and/or the user does not wish to be trimming vegetation.

The floating section 306 can be retracted within the control section 302 to reduce an overall length of the deck actuator 300 and raise the deck support 88. The floating section 306 can be extended out of the control section 302 to increase an overall length of the deck actuator 300 and lower the deck support 88. As the deck support 88 rotates upward or downward, the pivotal coupling of the housing 82 to the deck support 88 permits the force of gravity to maintain the mower deck 80 in a horizontal orientation.

Figures 4, 5, 6:
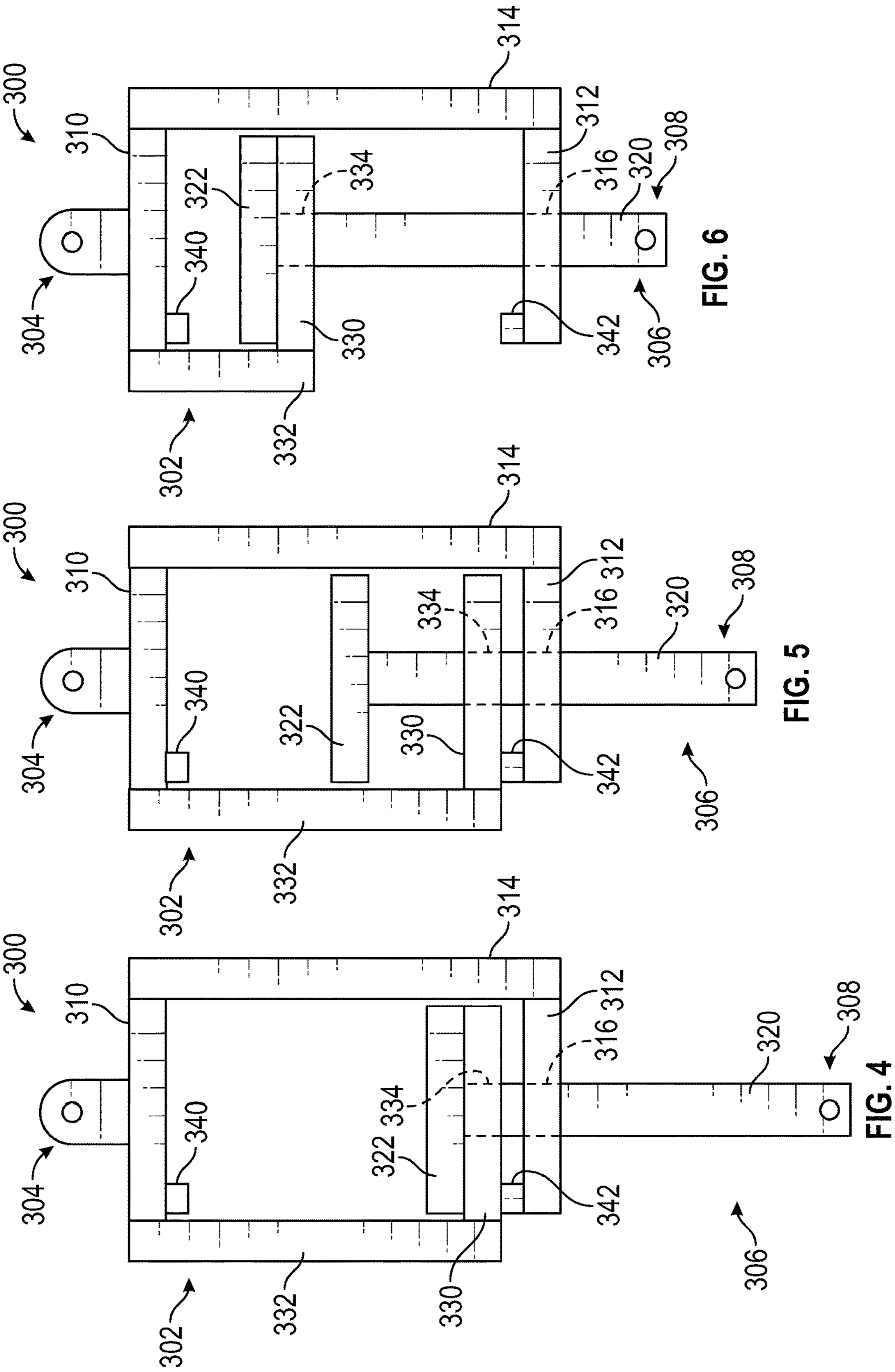
FIGS. 4, 5, and 6 are side views of a mower deck actuator of the mower of FIG. 1 at various stages of operation, according to an exemplary embodiment.

Referring to FIGS. 4-6, the deck actuator 300 is shown according to an exemplary embodiment. The control section 302 includes a first portion (e.g., a chassis, a base, a frame, one or more plates, etc.), shown as frame 310. The frame 310 defines the first end portion 304 of the control section 302 and supports the other components of the control section 302. A support or linear guide, shown as guide plate 312, is longitudinally offset from the frame 310. A connecting member, shown as standoff 314, extends from the frame 310 to the guide plate 312 and fixedly couples the guide plate 312 to the frame 310. An aperture or passage, shown as shaft passage 316, extends longitudinally through the guide plate 312.

The floating section 306 includes a sliding portion or rod, shown as actuator shaft 320, that is slidably coupled to the guide plate 312. As shown, the actuator shaft 320 extends through the shaft passage 316 defined by the guide plate 312, such that the actuator shaft 320 and the guide plate 312 together form a linear bearing or linear guide. The shaft passage 316 may be formed by a bushing to permit free movement of the actuator shaft 320 through the shaft passage 316. The actuator shaft 320 defines the second end portion 308 of the deck actuator 300. By way of example, a passage may extend laterally through the actuator shaft 320 to receive a pin that pivotally couples the actuator shaft 320 to the deck support 88. The actuator shaft 320 is shaped to form a stop, block, bumper, collar, or limiter, shown as shaft stop 322, that is fixed to the portion of the actuator shaft 320 opposite the second end portion 308. The shaft stop 322 extends radially and laterally outward beyond the actuator shaft 320.

The control section 302 further includes a stop, block, bumper, collar, or limiter, shown as control stop 330, positioned between the shaft stop 322 and the guide plate 312.

The actuator shaft 320 extends through a passage defined by the shaft stop 322, slidably coupling the actuator shaft 320 to the control stop 330. A linear actuator (e.g., an electric linear actuator, a hydraulic cylinder, a pneumatic cylinder, etc.), shown as actuator 332, is coupled to the frame 310 and the control stop 330. The actuator 332 may be operatively coupled to and controlled by the controller 110. The actuator 332 may control the position of the control stop 330 relative to the frame 310 by moving the control stop 330 longitudinally relative to the frame 310. The actuator 332 may selectively limit (e.g., prevent) movement of the control stop 330 relative to the frame. The control stop 330 defines a passage, shown as shaft passage 334, that extends longitudinally therethrough. The shaft passage 334 receives the actuator shaft 320, slidably coupling the actuator shaft 320 to the control stop 330.

The deck actuator 300 includes a pair of sensors, shown as retraction sensor 340 and extension sensor 342. The retraction sensor 340 and the extension sensor 342 are examples of the sensors 120. As shown in FIG. 2, the retraction sensor 340 and the extension sensor 342 operatively coupled to the controller 110. The retraction sensor 340 is coupled to the frame 310. The retraction sensor 340 may indicate a position of the shaft stop 322 relative to the frame 310. By way of example, the retraction sensor 340 may be or include a limit switch that engages the shaft stop 322 when the shaft stop 322 is in a fully retracted or fully raised position. The extension sensor 342 is coupled to the guide plate 312. The extension sensor 342 may indicate a position of the control stop 330 relative to the guide plate 312. By way of example, the extension sensor 342 may be or include a limit switch that engages the control stop 330 when the control stop 330 is in a fully extended or fully lowered position. In some embodiments, the retraction sensor 340 and/or the extension sensor 342 continuously indicate the relative positions of the shaft stop 322 and/or the control stop 330. By way of example, the retraction sensor 340 may include a linear potentiometer coupled to the frame 310 and the shaft stop 322. In some embodiments, the retraction sensor 340 and/or the extension sensor 342 are omitted.

Referring to FIGS. 4-6, the deck actuator 300 is shown at various stages of operation. In operation, the actuator 332 varies the longitudinal position of the control stop 330. In FIG. 4, the control stop 330 is shown in a fully extended configuration (i.e., the control stop 330 is at an extended end of its range of motion). In the fully extended configuration, the control stop 330 engages the extension sensor 342, and the extension sensor 342 may provide a signal to the controller 110 indicating the position of the control stop 330. In response to receiving this signal, the controller 110 may stop the actuator 332 from moving the control stop 330 further in the extension direction. As shown in FIG. 4, the shaft stop 322 engages the control stop 330, preventing further movement of the actuator shaft 320. Accordingly, the configuration illustrated in FIG. 4 may represent a fully extended configuration of the deck actuator 300 (i.e., where the deck actuator 300 is extended to the maximum allowable length).

In FIG. 5, the deck actuator 300 is shown in a floating configuration where the shaft stop 322 is spaced away from the control stop 330. In FIG. 5, the control stop 330 remains in the fully extended configuration. The control stop 330 limits the range of motion of the actuator shaft 320 in the extension direction, but the actuator shaft 320 is free to move away from the control stop 330 (e.g., until the shaft stop 322 contacts the frame 310). Once the shaft stop 322 is spaced away from the control stop 330 (e.g., as shown in FIG. 5), the actuator shaft 320 can freely extend until the shaft stop 322 engages the control stop 330. Accordingly, the actuator shaft 320 is free to move throughout a range of motion, but the range of motion is limited in an extension direction by the control stop 330.

In FIG. 6, the actuator 332 retracts, bringing the control stop 330 toward the frame 310 and away from the guide plate 312. This movement of the control stop 330 reduces the range of motion of the actuator shaft 320. If the shaft stop 322 initially starts beyond this reduced range of motion, the control stop 330 contacts the shaft stop 322 and forces the actuator shaft 320 to retract with the control stop 330. In the configuration of FIG. 6, the actuator shaft 320 is free to float throughout the reduced range of motion, but the range of motion does not extend as far in the extension direction as in the configuration of FIGS. 4 and 5.

If the shaft stop 322 reaches a fully retracted position (e.g., in which the shaft stop 322 contacts or is close to contacting the frame 310), the shaft stop 322 engages the retraction sensor 340, and the retraction sensor 340 may provide a signal to the controller 110 indicating the position of the shaft stop 322. If this signal is received while the actuator 332 is stationary or extending, the controller 110 may interpret the signal as an indication that the actuator shaft 320 is being retracted by an outside force and may take no action. If the signal is received while the actuator 332 is retracting the control stop 330 toward the frame 310, the controller 110 may interpret the signal as an indication that the control stop 330 is in a fully retracted configuration. In the fully retracted configuration, the control stop 330 forces the shaft stop 322 into the fully retracted position, and the actuator shaft 320 may be fixed (i.e., may no longer be permitted to move throughout a range of motion). In response to receiving this signal, the controller 110 may stop the actuator 332 from moving the control stop 330 further in the retraction direction.

Alternatively, the retraction sensor 340 may be positioned to be contacted by the control stop 330 instead of the shaft stop 322. In such a configuration, the retraction sensor 340 would provide direct feedback regarding the position of the control stop 330, regardless of outside forces on the actuator shaft 320. For example, the shaft stop 322 could move upward due to the application of an outside force onto the actuator shaft 320 (e.g., an upward force on the mower deck 80). If the retraction sensor 340 were positioned to be contacted by the control stop 330, such an input would not be detected by the retraction sensor 340, and the control stop 330 could be moved freely without interference by the controller 110. If the retraction sensor 340 were instead positioned to be contacted by the shaft stop 322, the controller 110 may limit movement of the control stop 330 in the retraction direction, even if the control stop 330 was not in the fully retracted configuration.

Referring to FIGS. 3-6, the deck actuator 300 may be used to permit floating actuation of the mower deck 80. Throughout operation of the mower 10, it may be desirable to set a mower deck 80 at a user-specified height. By way of example, a user may set the mower deck 80 to an operating height (e.g., an operating position) when using the mower 10 to trim vegetation. By way of another example, the user may raise the mower deck 80 from the operating height to a travel height (e.g., a travel position) above the cutting height. By raising the mower deck 80, the mower deck 80 is moved above a ground surface, preventing inadvertent trimming operations and permitting travel without the mower deck 80 contacting obstacles.

During a mowing operation, the mower deck 80 may be lowered to the operating height, and the mower motor 86 may be activated. A cutting height between the mower deck 80 and the ground surface may be predefined by the user based on the desired height of the vegetation trimmed by the mower 10. In some embodiments, the housing 82 includes a set of wheels that engage the ground surface to set the cutting height. In some embodiments, the position of the control stop 330 is set to define the cutting height.

At various points throughout operation, the mower deck 80 may encounter an obstacle (e.g., an incline or decline in the ground surface, a stone, a branch, etc.). As the mower 10 drives over the obstacle, the obstacle may force the mower deck 80 upward. In response to such an upward force, the actuator shaft 320 is forced in a retracting direction relative to the frame 310. The shaft stop 322 moves freely away from the control stop 330, such that the deck actuator 300 freely retracts to accommodate the upward force of the obstacle. When the mower 10 has passed the obstacle, the shaft stop 322 permits the actuator shaft 320 to freely extend due to the force of gravity on the mower deck 80 until the shaft stop 322 engages the control stop 330. In this way, the deck actuator 300 executes a floating control over the position of the mower deck 80 in which the deck actuator 300 permits free upward movement of the mower deck 80 and prevents downward movement of the mower deck 80 beyond the position set by the control stop 330. Because the actuator shaft 320 is free floating, the deck actuator 300 may not limit an upward or downward speed of the mower deck 80.

Other mower deck actuators do not have the floating capabilities of the deck actuator 300. Instead, the other actuators actively control the vertical position of a mower deck at all times, resisting vertical movement of the mower deck driven by an external force (e.g., from the obstacle). These actuators may limit the upward speed of the mower deck, such that the actuator undergoes significant forces when encountering an obstacle (e.g., potentially damaging the actuator, potentially causing the electric motor of the actuator to generate undesired electrical energy, etc.). These actuators may also limit the downward speed of the mower deck, which prevents the mower deck from immediately returning to the operating height after passing an obstacle and causes a disruption in the cutting operation.

In FIGS. 4-6, the control stop 330 is shown to limit extension of the deck actuator 300 and permit free retraction of the deck actuator 300. In other embodiments, the deck actuator 300 is configured to limit retraction of the deck actuator 300 and permit free extension of the deck actuator 300. By way of example, the control stop 330 may be positioned between the frame 310 and the shaft stop 322. Such a control stop 330 may be used as an alternative to the position of the control stop 330 shown in FIGS. 4-6. Alternatively, a first control stop 330 may be positioned between the frame 310 and the shaft stop 322, and a second control stop 330 may be positioned between the guide plate 312 and the shaft stop 322. In such an embodiment, each control stop 330 may be independently controlled by a separate actuator to independently vary a different end of the range of motion of the actuator shaft 320.

One possible application for a deck actuator 300 that is configured to limit retraction and permit free extension is as a secondary braking system in a vehicle (e.g., a train or automobile). In such an example, the actuator shaft 320 may be coupled to a braking element, such as a brake caliper. During normal operation, the deck actuator 300 would have a large permitted range of motion, and the position of the actuator shaft 320 would be controlled by a primary braking system (e.g., a pneumatic or hydraulic braking system). When desired (e.g., in response to a demand for a parking brake or emergency brake), the actuator 332 would override the primary braking system by reducing the range of motion and forcing the actuator shaft 320 outward to engage the brake.

Deck Actuator with Threaded Rods

Referring to FIGS. 7-13, a deck actuator 300 is shown according to an exemplary embodiment. The deck actuator 300 shown in FIGS. 7-13 represents one possible configuration of the deck actuator 300 of FIGS. 4-6. Accordingly, any description of with respect to the deck actuator 300 shown in FIGS. 4-6 may apply to the deck actuator 300 of FIGS. 7-13, except as otherwise specified herein.

The frame 310 of the deck actuator 300 includes a series of plates. Specifically, the frame 310 includes an end plate 400, a middle plate 402, and an end plate 404 extending parallel to one another. The middle plate 402 extends between the end plate 400 and the end plate 404. A support plate 406 extends perpendicular to the end plate 400, the middle plate 402, and the end plate 404. The end plate 400, the middle plate 402, and the end plate 404 are each fixedly coupled to the support plate 406 and to one another (e.g., through welding, fastening, etc.). A series of standoffs may extend between the end plate 400, the middle plate 402, and/or the end plate 404 to maintain a first spacing between the end plate 400 and the middle plate 402, and a second spacing between the middle plate 402 and the end plate 404.

The deck actuator 300 includes a pair of standoffs 314 that extend between the end plate 404 and the guide plate 312. The standoffs 314 fixedly couple the end plate 404 to the guide plate 312 and maintain a fixed distance between the end plate 404 and the guide plate 312. By way of example, the standoffs 314 may each be in threaded engagement with the guide plate 312 and the end plate 404. The standoffs 314 may each be formed as cylindrical rods.

The control stop 330 forms a first pair of apertures or passages, shown as threaded passages 410. The threaded passages 410 each extend longitudinally through the control stop 330. The threaded passages 410 are each internally threaded. By way of example, the threaded passages 410 may each be at least partially defined by a nut of the control stop 330. The control stop 330 forms a second pair of apertures or passages, shown as through holes 412, that each extend longitudinally through the control stop 330. Each through hole 412 is sized to receive one of the standoffs 314. The relative sizes and shapes of the through holes 412 and the standoffs 314 may be matched to permit free sliding movement of the control stop 330 along the standoffs 314. By way of example, the standoffs 314 may have a circular cross section, and the through holes 412 may be circular and a clearance fit for the standoffs 314. The threaded passage 410 and the through holes 412 are arranged in a square pattern centered about the actuator shaft 320. Accordingly, the threaded passages 410 and the through holes 412 are each equidistant from the actuator shaft 320. The threaded passages 410 are arranged on opposite sides of the actuator shaft 320, and the through holes 412 are arranged on opposite sides of the actuator shaft 320.

The shaft stop 322 forms four apertures or passages, shown as through holes 420, that each extend longitudinally through the shaft stop 322. Each through hole 420 is sized to receive one of the standoffs 314 or one of the threaded rods 442 described herein. Each through hole 420 is aligned with one of the through holes 412 or one of the threaded passages 410.

The actuator 332 includes a motor (e.g., an electric motor, a hydraulic motor, etc.) shown as electric motor 440, and a pair of threaded rods or screws, shown as threaded rods 442. The electric motor 440 drives rotation of the threaded rods 442 to control the position of the control stop 330. The threaded rods 442 extend from the end plate 404 to the guide plate 312 and are rotatably coupled to the end plate 404 and the guide plate 312. Each threaded rod 442 extends through one of the through holes 420 and one of the threaded passages 410.

The electric motor 440 is rotationally coupled to the threaded rods 442 by a gearbox, power transmission, driveline, or gear train, shown as transmission 450. The transmission 450 transfers rotational mechanical energy from the electric motor 440 to the threaded rods 442. Accordingly, rotation of the electric motor 440 causes a corresponding rotation of both threaded rods 442. Due to engagement between the threaded rods 442 and the threaded passages 410, the rotation of the threaded rods 442 causes a corresponding linear movement of the control stop 330 along the standoffs 314. Rotation of the threaded rods 442 in a first direction causes the control stop 330 to move in an extension direction. Rotation of the threaded rods 442 in an opposing, second direction causes the control stop 330 to move in a retraction direction. Accordingly, the controller 110 may control the position of the control stop 330 by controlling rotation of the electric motor 440 (e.g., by changing a voltage, current, frequency, and/or polarity of electrical energy supplied to the electric motor 440).

Figure 10:
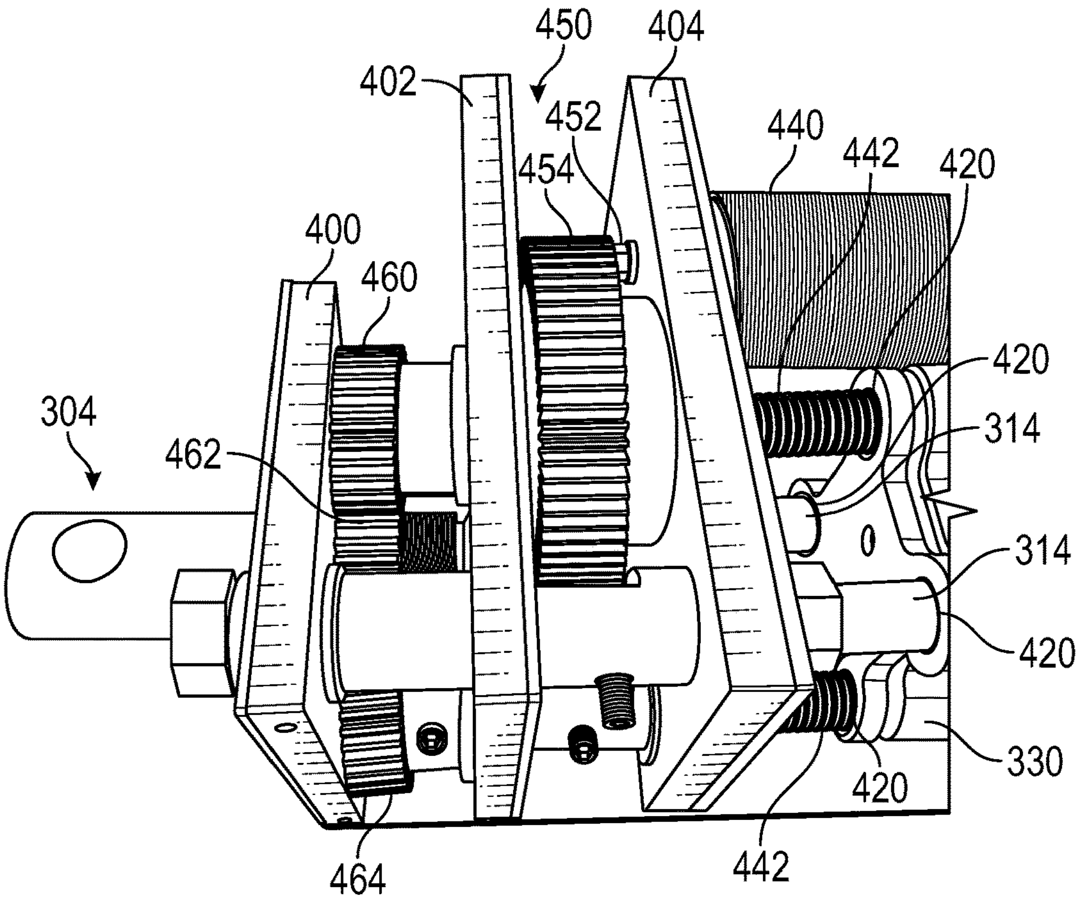
FIG. 10 is a perspective view of a transmission of the mower deck actuator of FIG. 7.
Figure 11:
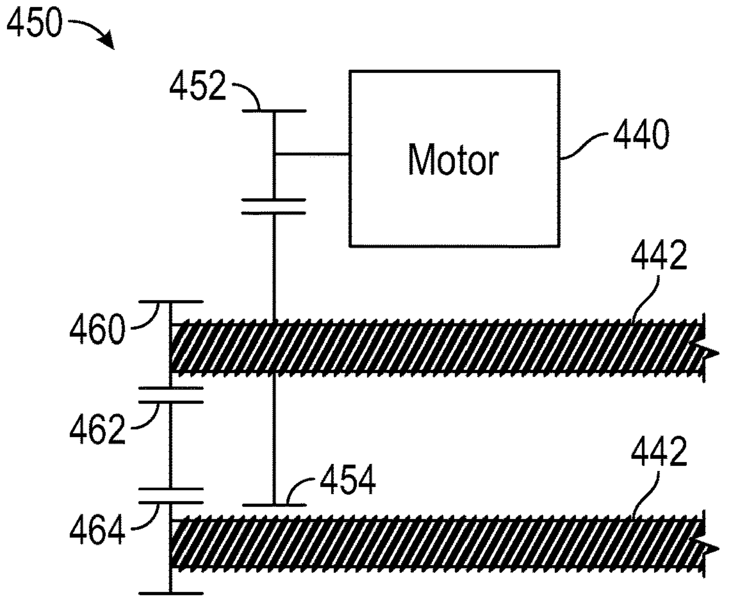
FIG. 11 is a schematic diagram of the transmission of FIG. 10.
Figure 12:
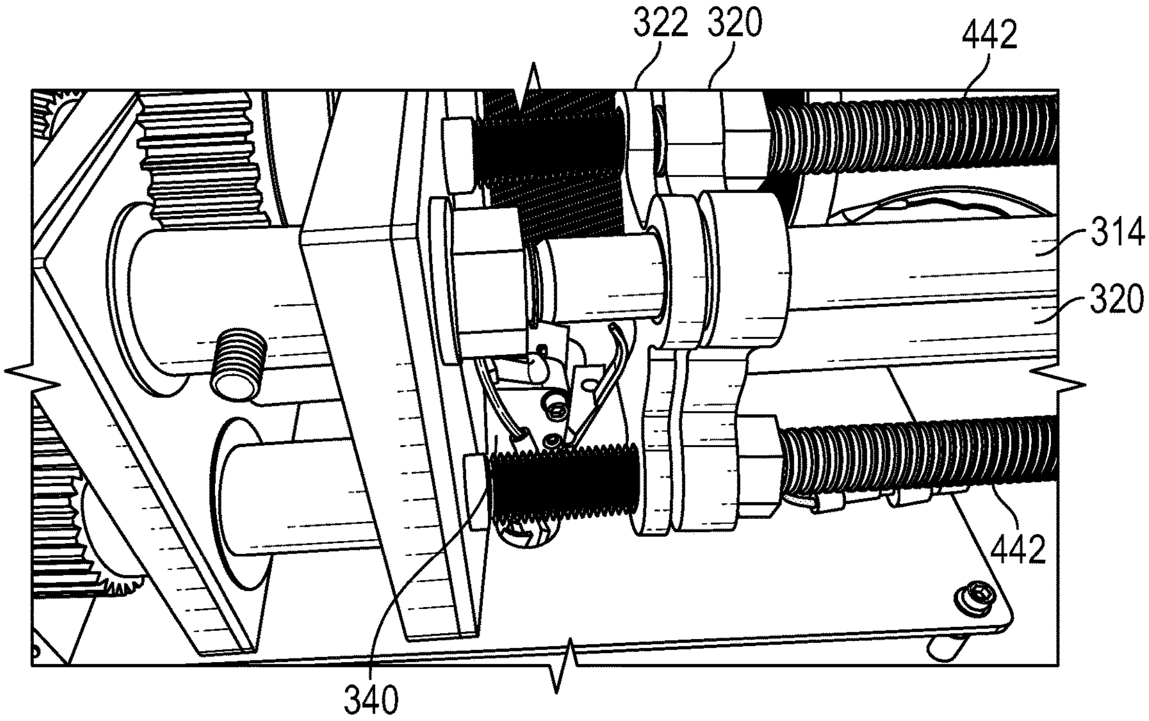
FIGS. 12 and 13 are perspective views of sensors of the mower deck actuator of FIG. 7.
Figure 13:
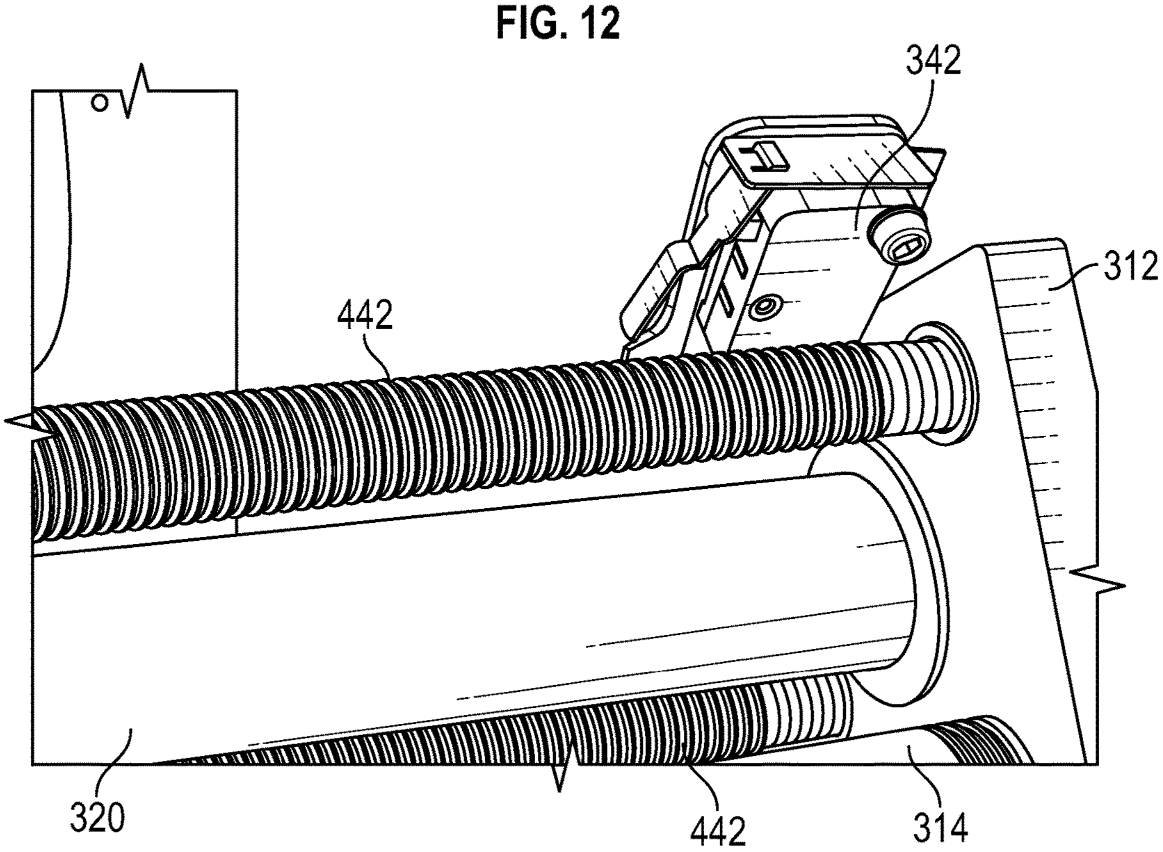

Referring to FIGS. 10 and 11, the transmission 450 is shown according to an exemplary embodiment. The transmission 450 has a two-stage arrangement formed using a series of spur gears. A first stage is positioned between the middle plate 402 and the end plate 404. The first stage includes a pinion gear 452 in meshing engagement with a gear 454. The gear 454 is fixedly coupled to a first one of the threaded rods 442. The pinion gear 452 is coupled to an output shaft of the electric motor 440. The pinion gear 452 is smaller in diameter than the gear 454, reducing an output speed and increasing an output torque of the transmission 450.

A second stage is positioned between the end plate 400 and the middle plate 402. The second stage includes a screw gear 460 that is fixedly coupled to the gear 454 and the first one of the threaded rods 442, such that the screw gear 460, the gear 454, and the first one of the threaded rods 442 rotate at the same speed and in the same direction. An idler gear 462 is in meshing engagement with the screw gear 460 and a screw gear 464. The screw gear 464 is fixedly coupled to a second one of the threaded rods 442. Accordingly, the transmission 450 transfers rotational mechanical energy from the pinion gear 452 to the screw gear 460 and the screw gear 464.

Due to the position of the idler gear 462 between the screw gear 460 and the screw gear 464, the idler gear 462 causes the screw gear 460 and the screw gear 464 to rotate in the same direction. Accordingly, both of the threaded rods 442 may be threaded in the same direction (e.g., both right hand thread, both left hand thread, etc.). In other embodiments, the idler gear 462 is omitted, and the screw gear 460 directly engages the screw gear 464. In such an embodiment, the screw gear 460 and the screw gear 464 rotate in opposite directions. Accordingly, the threaded rods 442 may be threaded in opposing directions (e.g., one left hand thread and one right hand thread).

In some embodiments, the actuator 332 is configured to hold the control stop 330 in place under the load of the actuator shaft 320 without requiring a supply of energy from an outside source (e.g., without electrical energy being supplied to the electric motor 440). It may be desirable for the deck actuator 300 to hold the mower deck 80 at the desired height until the desired height changes, even if the mower 10 is powered off. This may reduce wear on components (e.g., from repeatedly having to raise the mower deck 80 back to the desired position) and/or the burden on the operator (e.g., from having to repeatedly confirm the position of the mower deck 80). In some embodiments, the pitch of the threads on the threaded rods 442 is selected such that the frictional forces between the threads of the control stop 330 and the threaded rods 442 is sufficient to prevent backdriving of the threaded rods 442 when applying a longitudinal force on the control stop 330. An exemplary configuration of the deck actuator 300 was tested in which the mating surfaces of the threaded rods 442 and the control stop 330 were both steel having a coefficient of static friction of 0.25. In this testing, it was determined that a thread pitch of 15 degrees or less was sufficient to hold the control stop 330 in place as desired.

Figure 7:
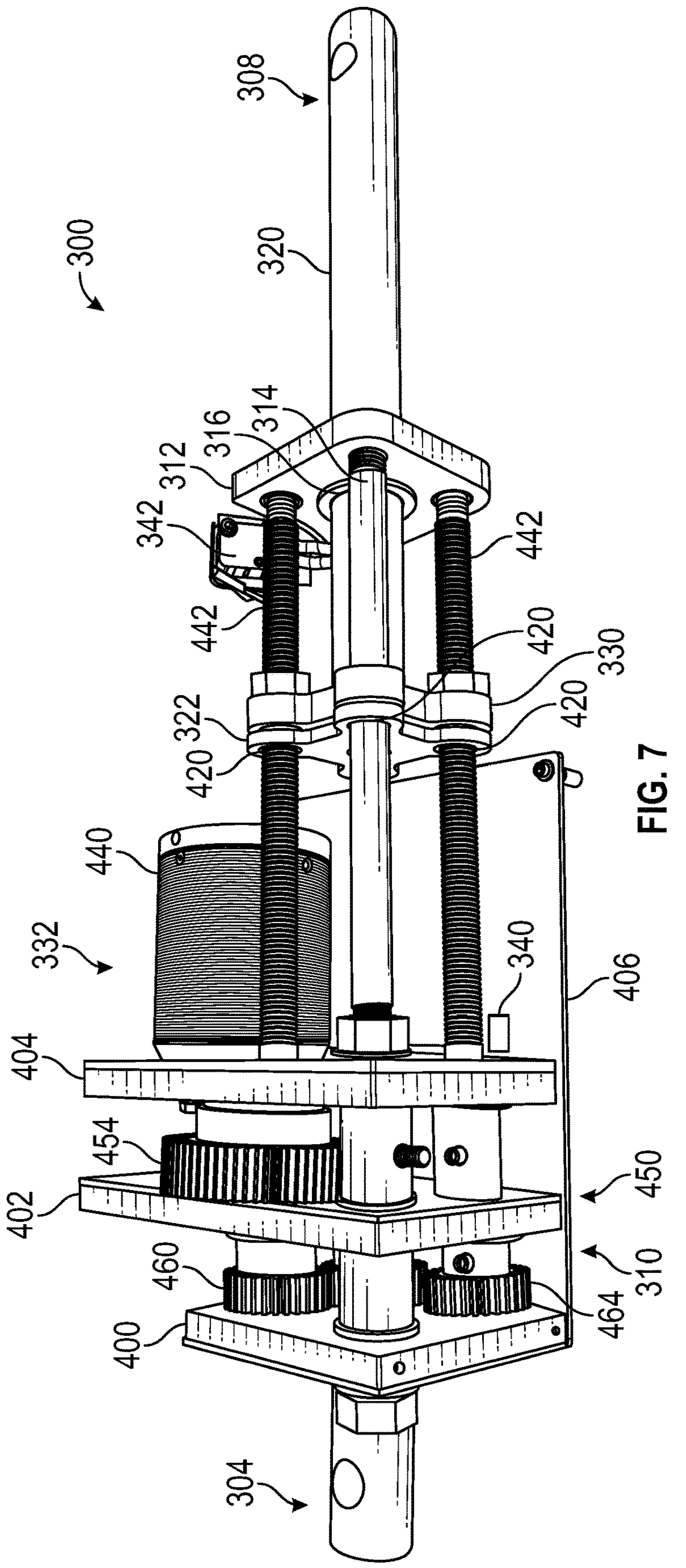
FIGS. 7, 8, and 9 are perspective views of the mower deck actuator of FIG. 4 at various stages of operation, according to an exemplary embodiment.
Figure 8:
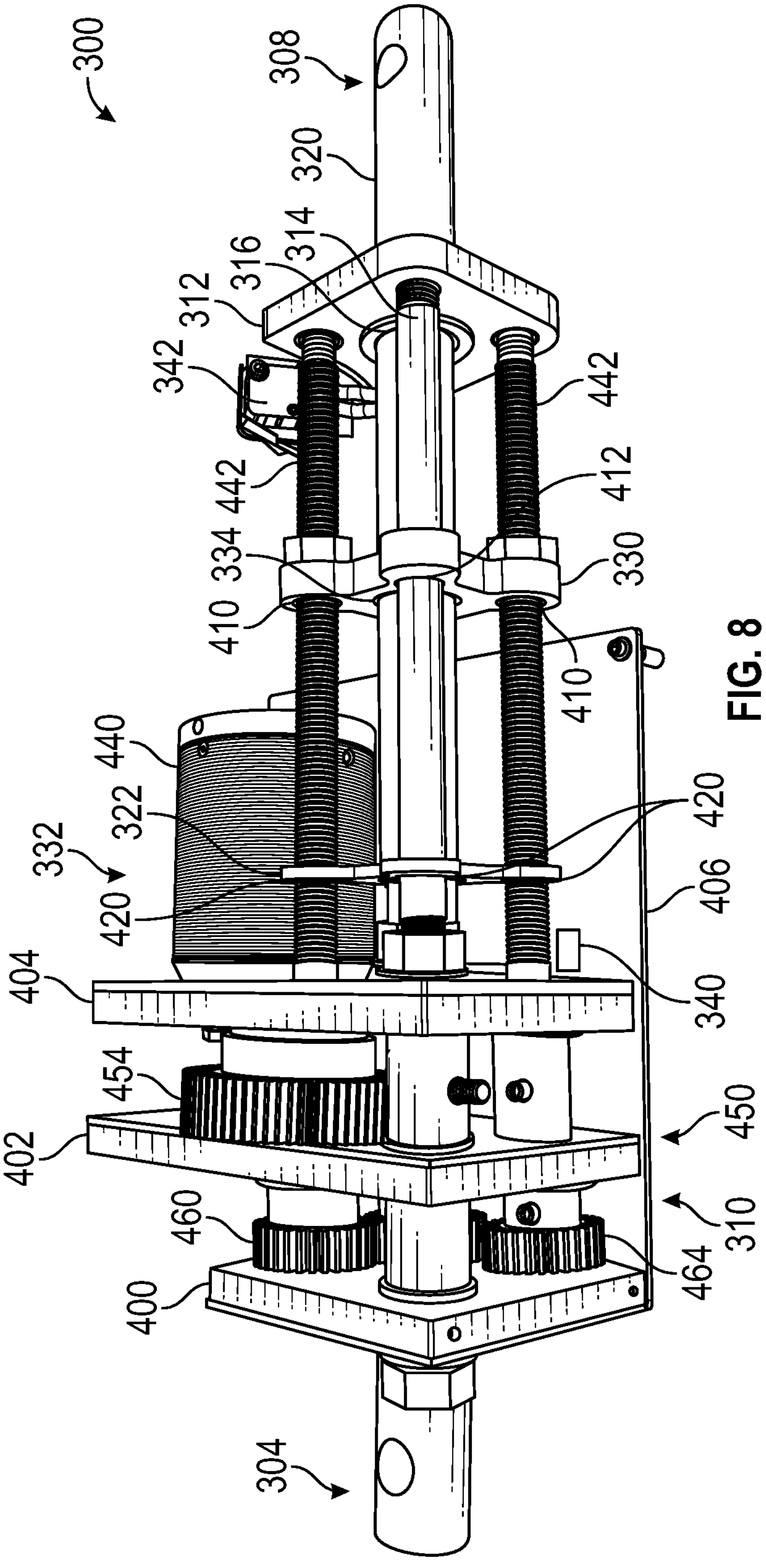
Figure 9:
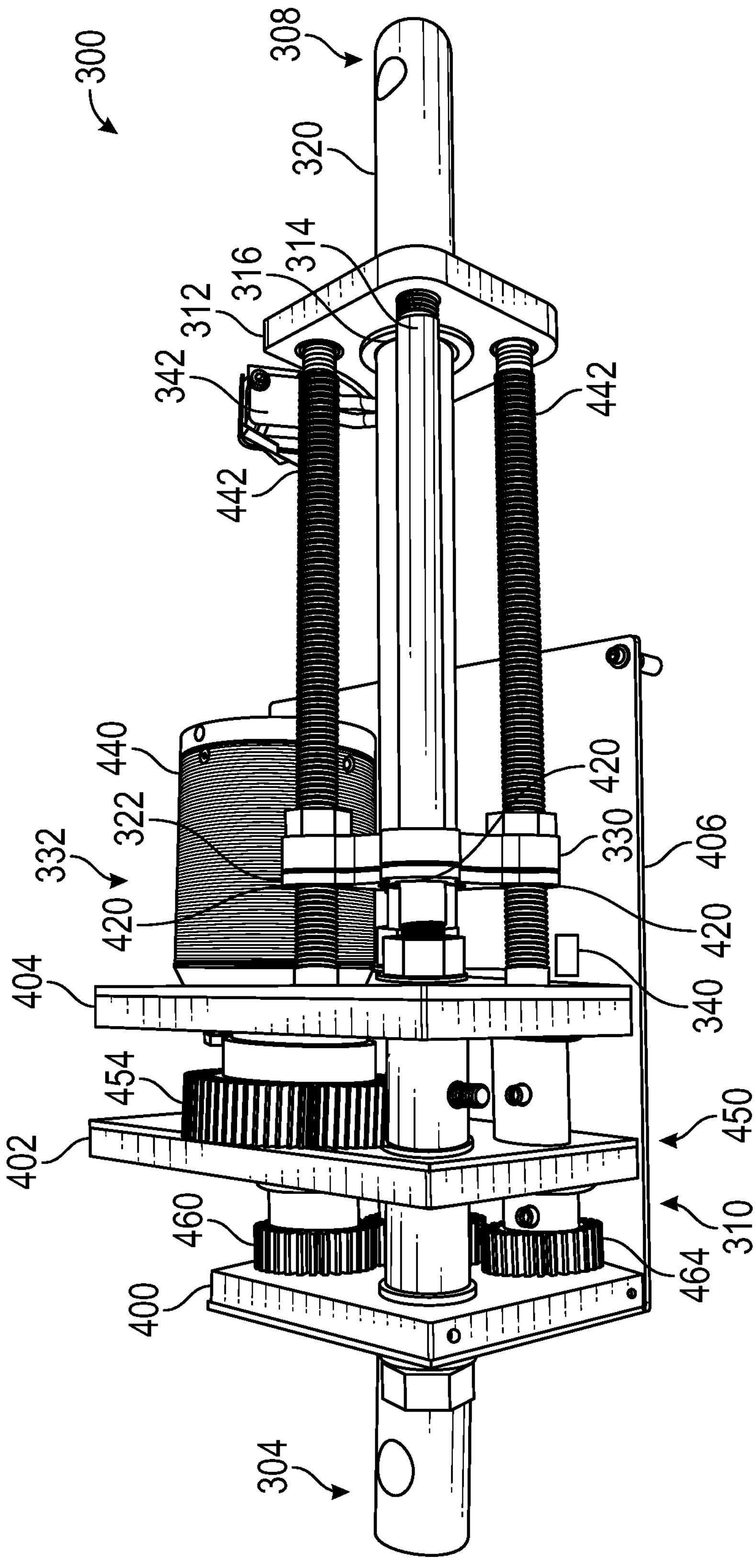

FIGS. 7-9 illustrate the deck actuator 300 at various stages of operation. In FIG. 7, the shaft stop 322 engages the control stop 330, preventing further extension of the actuator shaft 320. In FIG. 8, the shaft stop 322 has moved freely away from the control stop 330 due to a compressive force on the deck actuator 300 (e.g., an upward force on the mower deck 80). In FIG. 9, the electric motor 440 has driven the control stop 330 toward the frame 310, limiting the range of motion of the actuator shaft 320.

Figure 14:
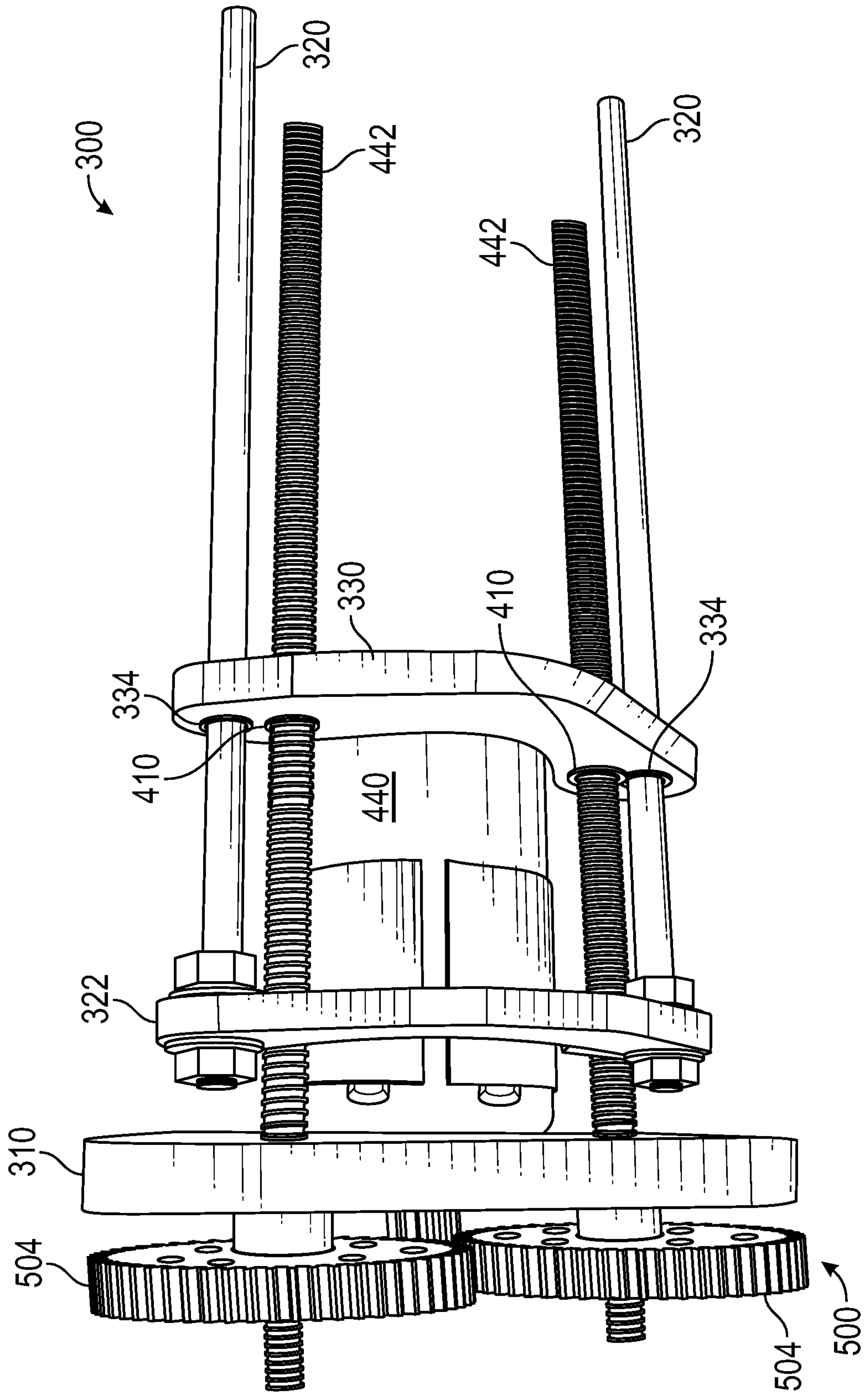
FIGS. 14 and 15 are perspective views of the mower deck actuator of FIG. 4 at various stages of operation, according to another exemplary embodiment.
Figure 15:
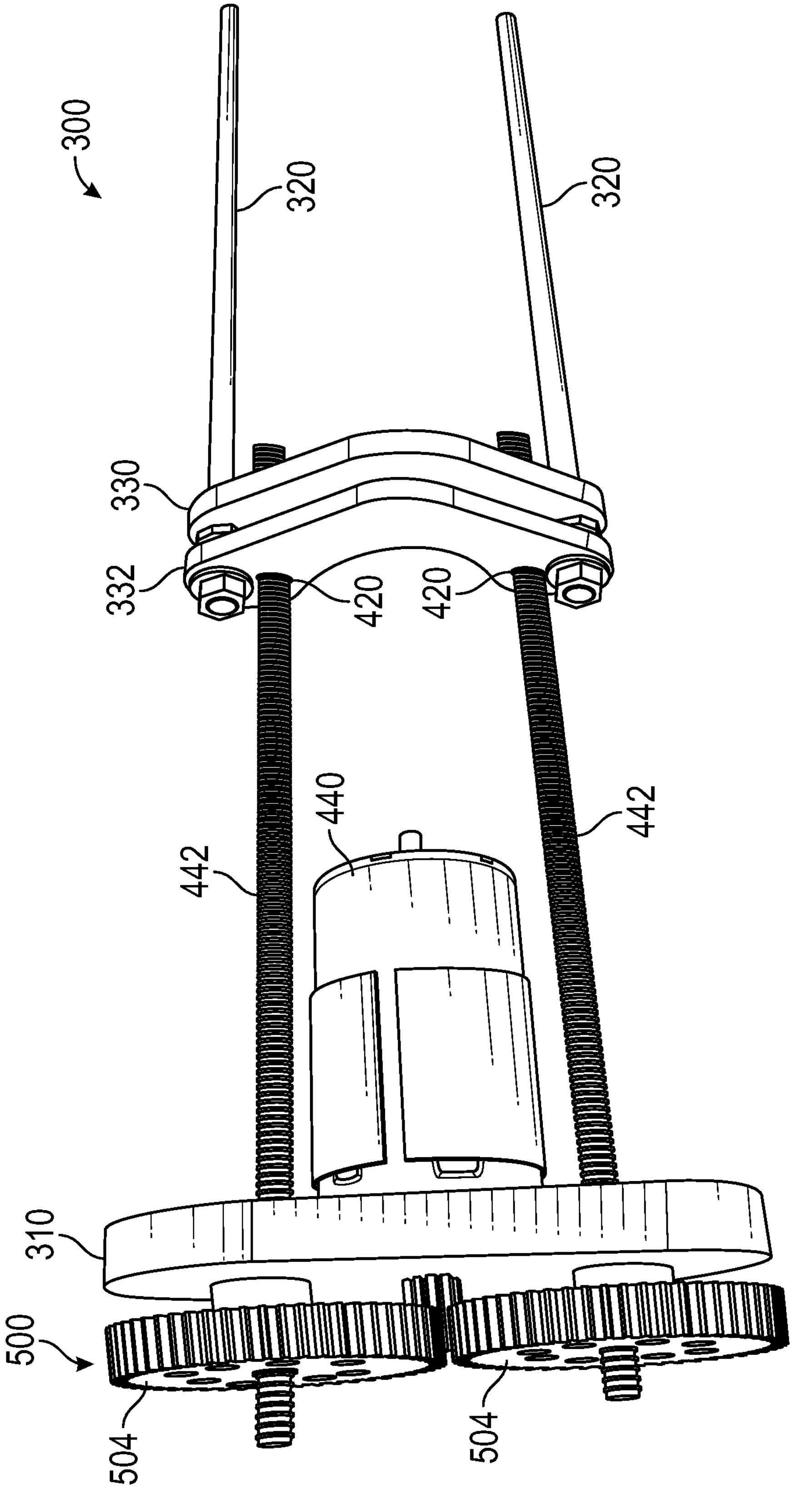
Figure 16:
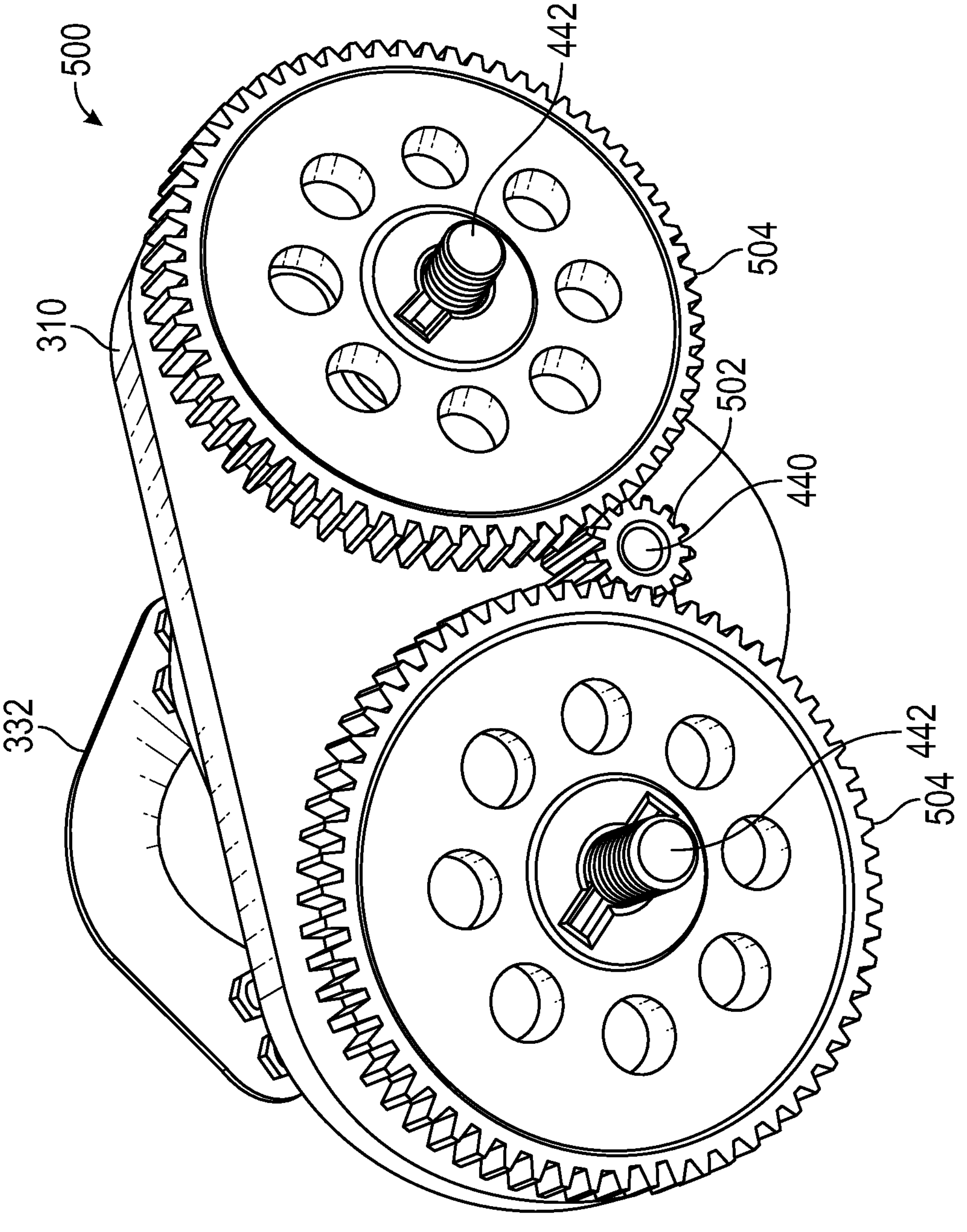
FIG. 16 is a perspective view of a transmission of the mower deck actuator of FIG. 14.

Referring to FIGS. 14-16, a deck actuator 300 is shown according to an exemplary embodiment. The deck actuator 300 shown in FIGS. 14-16 represents another possible configuration of the deck actuator 300 of FIGS. 4-6 and may be substantially similar to the deck actuator 300 of FIGS. 7-13. Any description of with respect to the deck actuator 300 shown in FIGS. 4-6 or the deck actuator 300 of FIGS. 7-13 may apply to the deck actuator 300 of FIGS. 14-16, except as otherwise specified herein.

The deck actuator 300 of FIGS. 14-16 includes two actuator shafts 320 each fixedly coupled to the shaft stop 322 and each extending through a shaft passage 334 defined by the control stop 330. Although the standoffs 314 and the guide plate 312 are omitted from FIGS. 14-16, it should be understood that the deck actuator 300 may include a pair of standoffs 314 and a guide plate 312, and the actuator shafts 320 may each be received through a shaft passage 316 of the guide plate 312.

The deck actuator 300 of FIGS. 14-16 includes a transmission 500 in place of the transmission 450. The transmission 500 is similar to the transmission 450, except the transmission 500 has a single-stage arrangement. A pinion gear 502 is coupled to an output shaft of the electric motor 440. The pinion gear 502 is in direct meshing engagement with a pair of screw gears 504, and each screw gear 504 is rotationally fixed to one of the threaded rods 442. The pinion gear 502 is smaller in diameter than the screw gears 504, reducing an output speed and increasing an output torque of the transmission 500. Because the pinion gear 502 directly engages the screw gears 504, both threaded rods 442 rotate in the same direction.

Deck Actuator With Linkages

Referring to FIGS. 17-27, a deck actuator 300 is shown according to an exemplary embodiment. The deck actuator 300 shown in FIGS. 17-27 represents another possible configuration of the deck actuator 300 of FIGS. 4-6 and may be substantially similar to the deck actuator 300 of FIGS.

7-13. Any description of with respect to the deck actuator 300 shown in FIGS. 4-6 or the deck actuator 300 of FIGS. 7-13 may apply to the deck actuator 300 of FIGS. 17-27, except as otherwise specified herein.

The deck actuator 300 of FIGS. 17-27 includes one control section 302 and a pair of floating sections 306. The control section 302 is positioned between the floating sections 306 and receives each floating section 306. For ease of description, one of the floating sections 306 and portions of the control section 302 will be referred to as a first end assembly 600, and the other of the floating sections 306 and portions of the control section 302 will be referred to as a second end assembly 602. The floating section 306 of the first end assembly 600 defines the first end portion 304, and the floating section 306 of the second end assembly 602 defines the second end portion 308. Accordingly, the deck actuator 300 may be coupled to the frame 12 and the deck support 88 by the floating sections 306.

Figure 17:
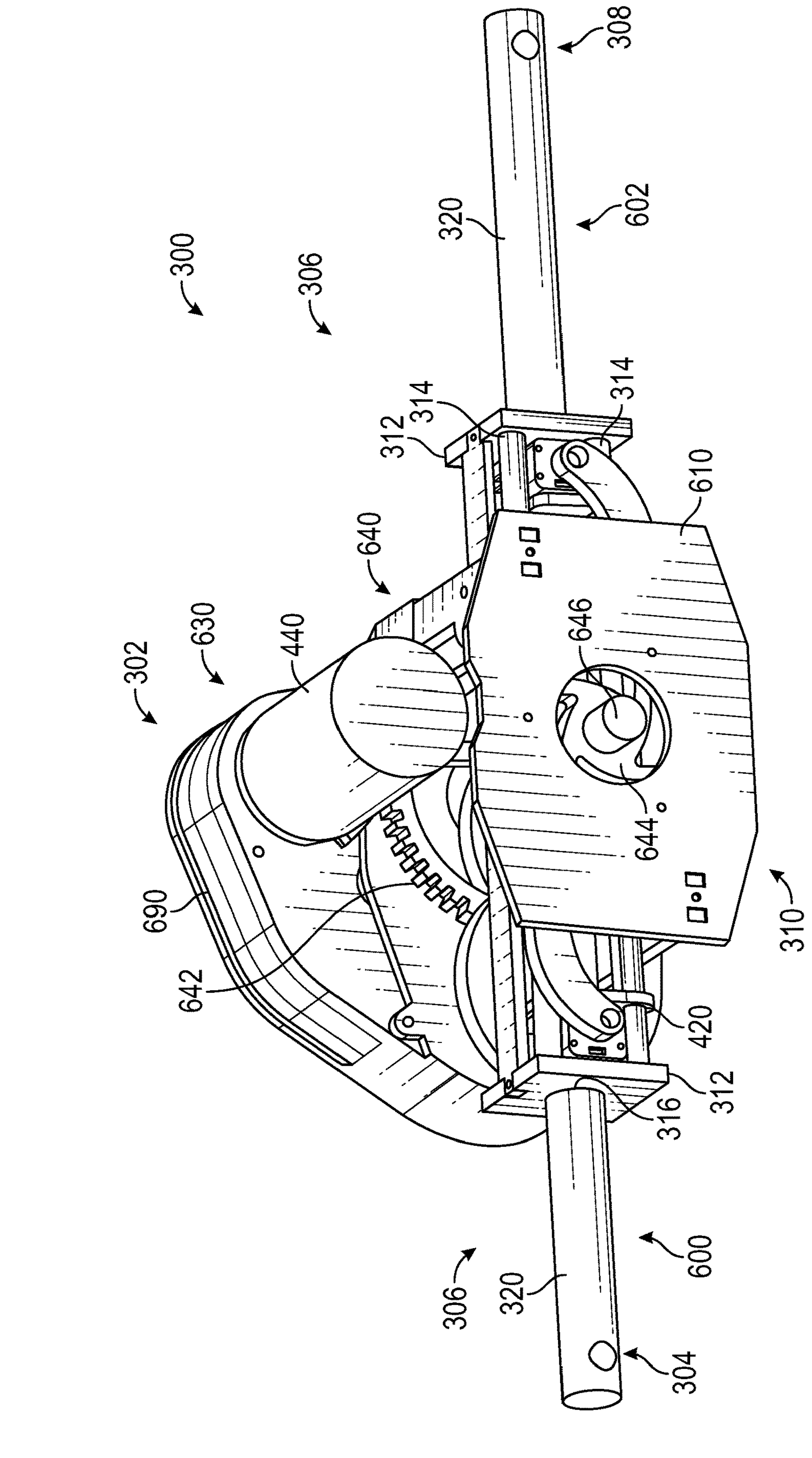
FIG. 17 is a perspective view of the mower deck actuator of FIG. 4, according to another exemplary embodiment.
Figure 18:
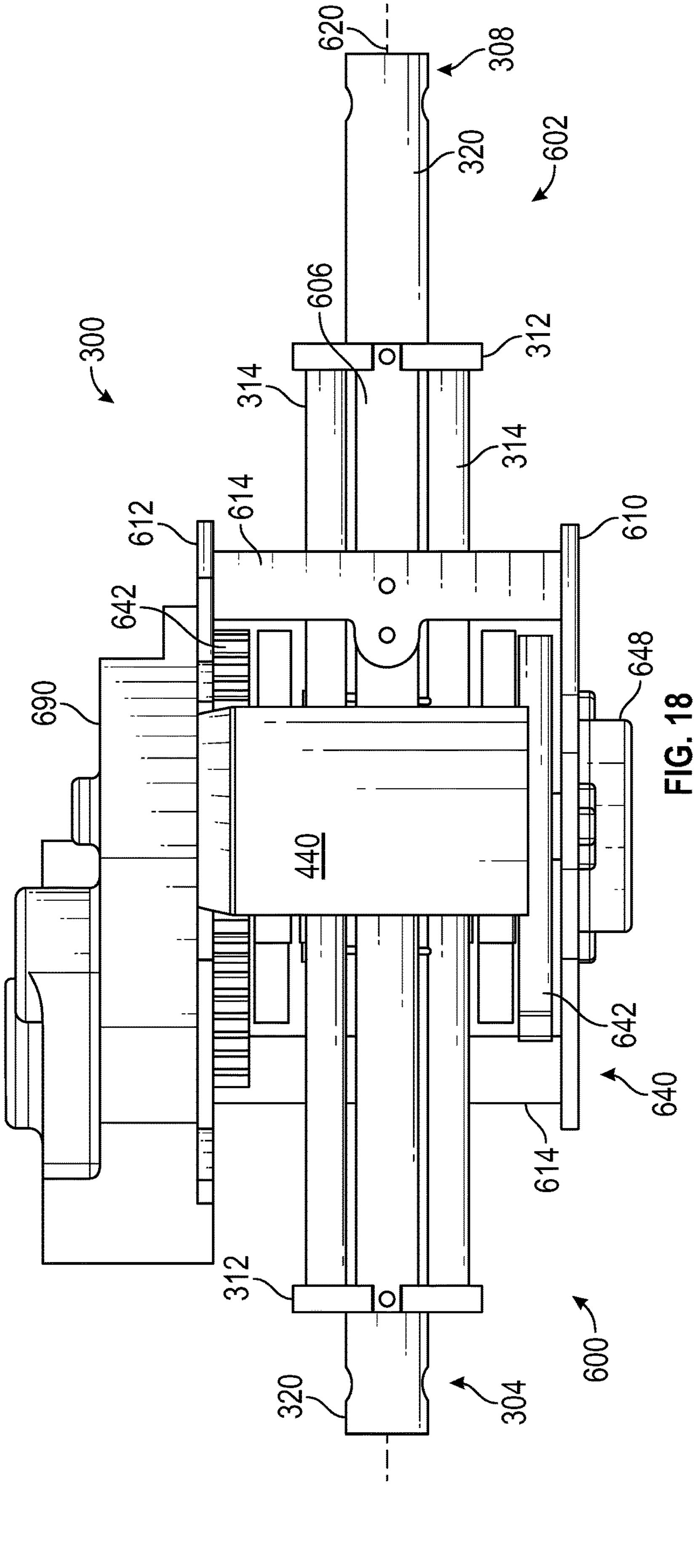
FIG. 18 is a top view of the mower deck actuator of FIG. 17.
Figure 19:
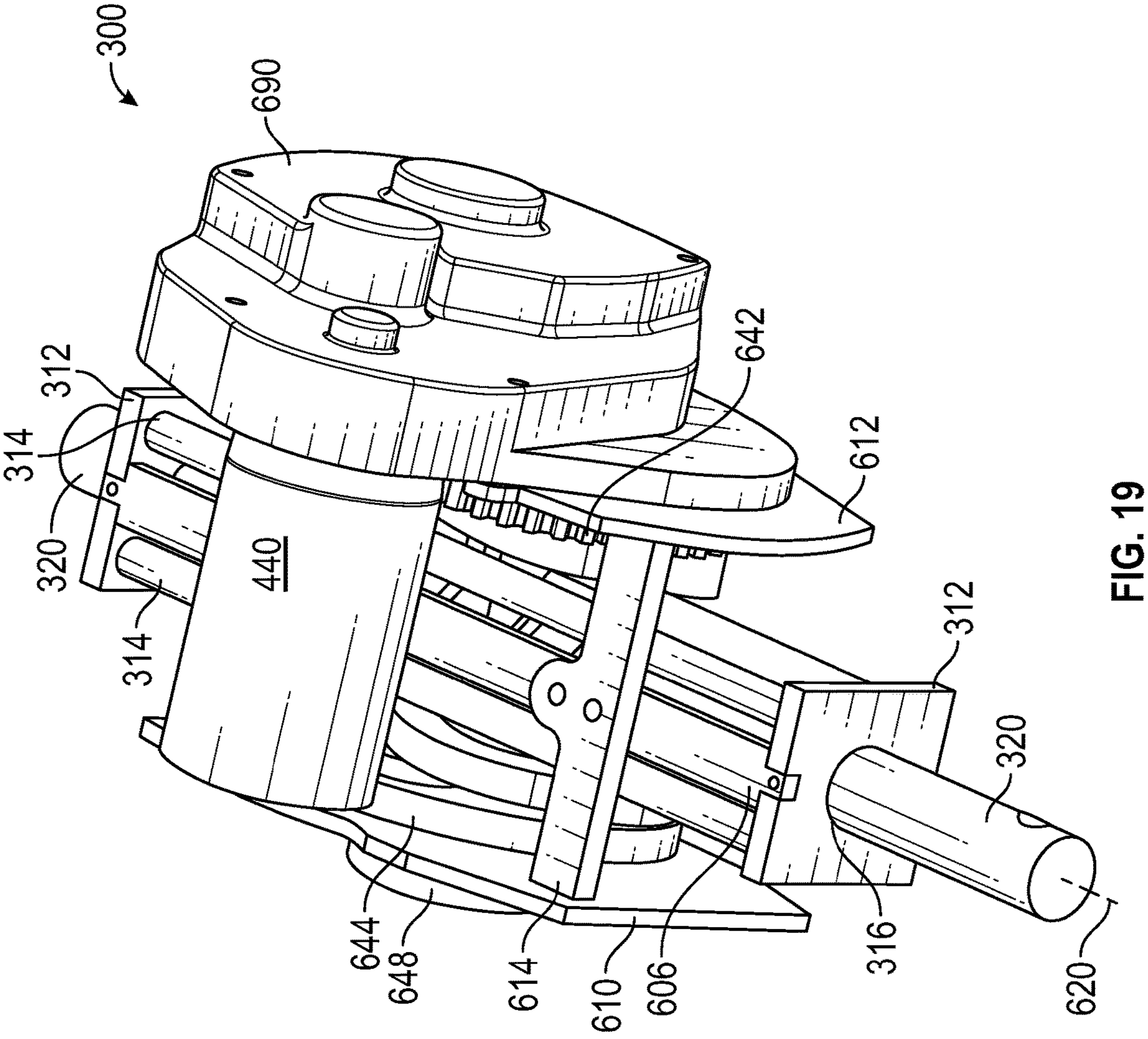
FIG. 19 is another perspective view of the mower deck actuator of FIG. 17.

Referring to FIGS. 17-19, the frame 310 of the deck actuator 300 includes a pair of guide plates 312 longitudinally offset from one another, each belonging to one of the end assemblies 600 and 602. The guide plates 312 may be placed such that the shaft passages 316 are aligned with one another (e.g., are centered about a common longitudinal axis). A pair of support members, shown as guide plate spacers 606, extend longitudinally between the guide plates 312. One guide plate spacer 606 is positioned at the top of the guide plates 312, and the other guide plate spacer 606 is positioned at the bottom of the guide plates 312. An end portion of each guide plate spacer 606 is fixedly coupled to one of the guide plates 312. The guide plate spacers 606 facilitate maintaining a fixed distance and orientation between the guide plates 312.

The deck actuator 300 includes four standoffs 314 that extend between the guide plates 312. The standoffs 314 fixedly couple the guide plates 312 to one another and maintain a fixed distance between the guide plates 312. By way of example, the standoffs 314 may each be in threaded engagement with the guide plates 312. The standoffs 314 may each be formed as cylindrical rods. The standoffs 314 are arranged in a square pattern centered about the shaft passages 316.

The frame 310 further includes a pair of plates or supports, shown as support plate 610 and support plate 612. The support plates 610 and 612 are laterally offset from one another, such that the standoffs 314 and the guide plate spacers 606 extend between the support plates 610 and 612. A pair of support members, shown as lateral supports 614, extend laterally between the support plates 610 and 612. The lateral supports 614 are each fixedly coupled to one of the guide plate spacers 606. The guide plates 312, the standoffs 314, the guide plate spacers 606, the support plates 610 and 612, and the lateral supports 614 are all fixedly coupled to one another (e.g., with fasteners, by welding, etc.) to form the frame 310.

Figure 20:
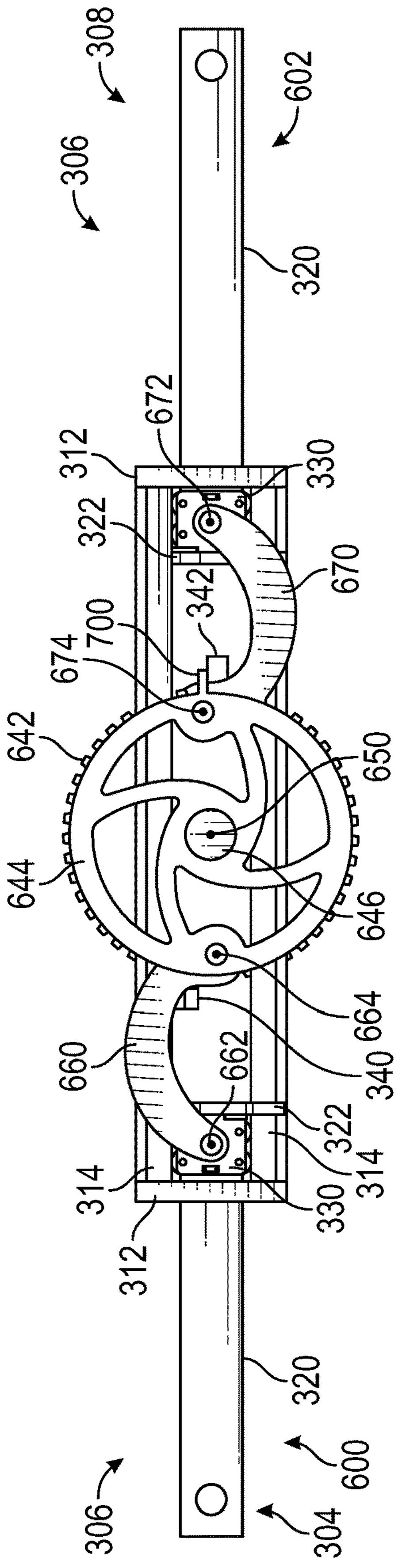
FIGS. 20 and 21 are front views of the mower deck actuator of FIG. 17 at various stages of operation.
Figure 21:
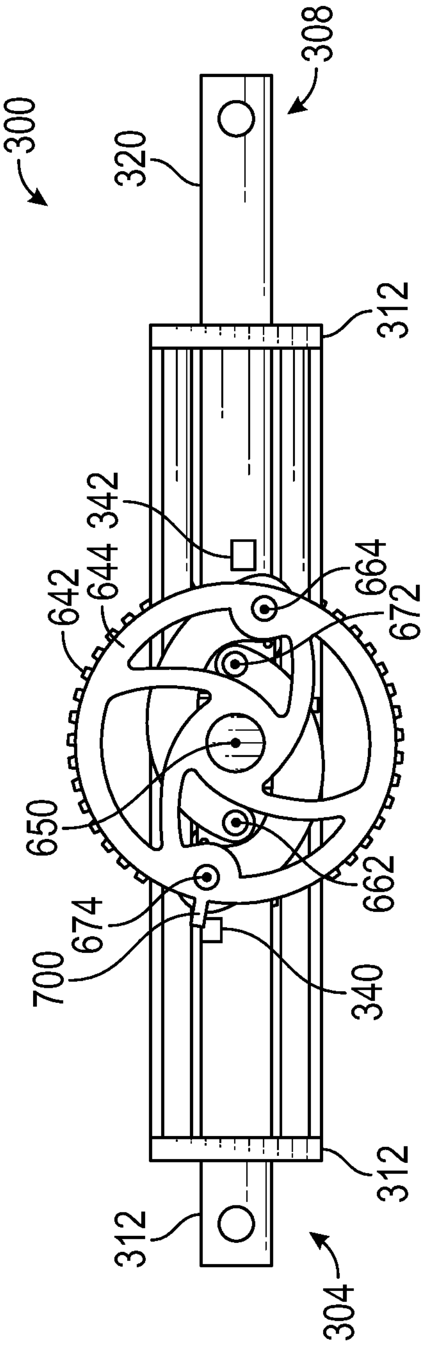
Figure 22:
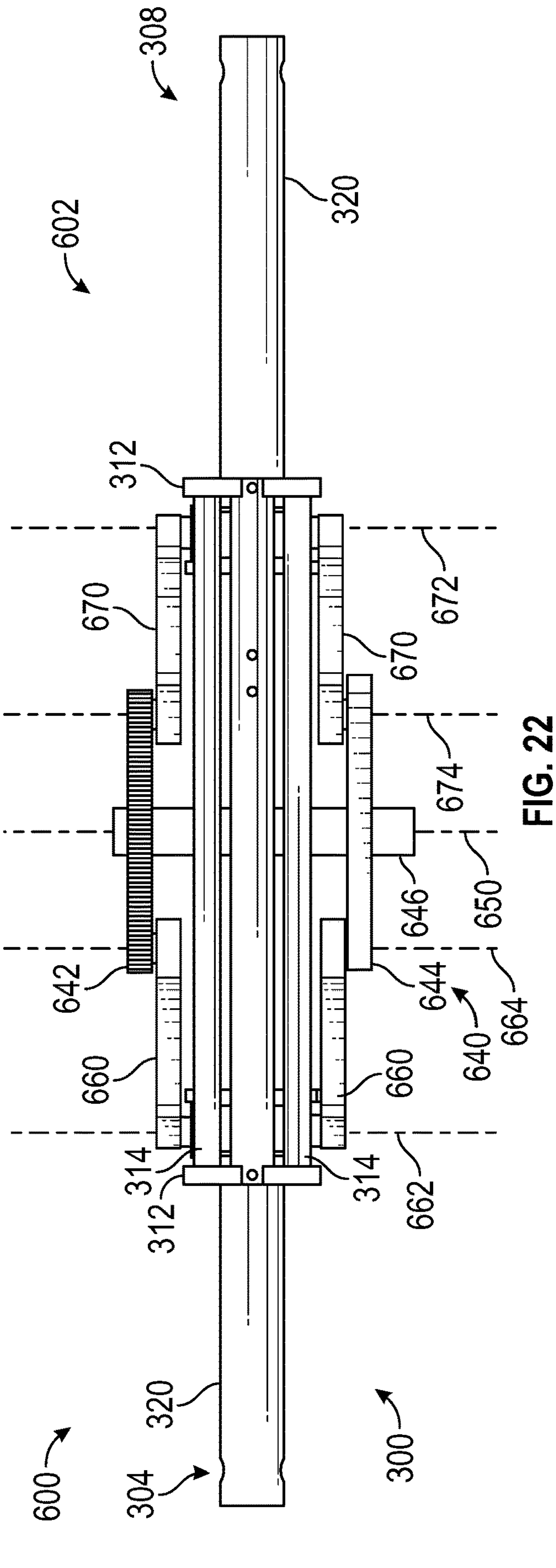
FIGS. 22 and 23 are top view of the mower deck actuator of FIG. 17 at various stages of operation.
Figure 23:
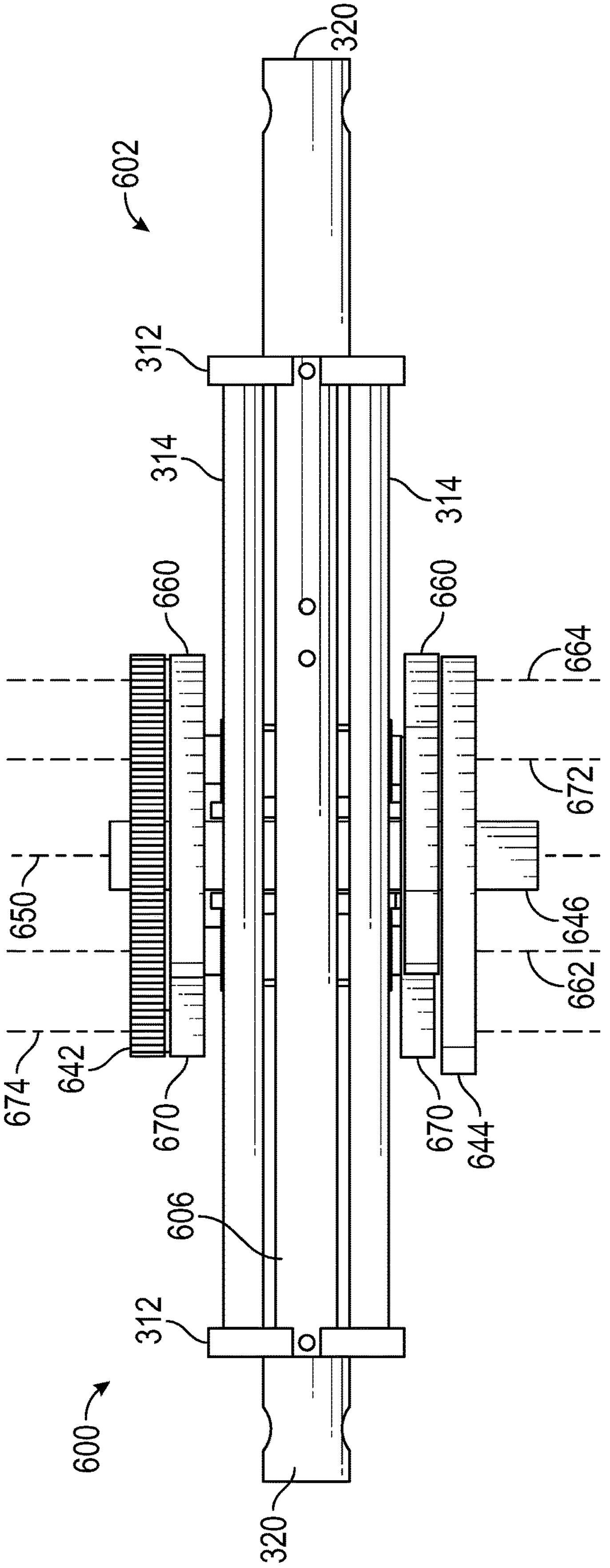

The deck actuator 300 includes a pair of actuator shafts 320, each belonging to one of the end assemblies 600 and 602. Each actuator shaft 320 is positioned within one of the shaft passages 316, slidably coupling the actuator shaft 320 to the corresponding guide plate 312. A first actuator shaft 320 extends away from the guide plate 312 in a first direction, and a passage extends laterally through an end portion of the first actuator shaft 320 to define the first end portion 304. A second actuator shaft 320 extends away from the guide plate 312 in a second direction opposite the first direction, and a passage extends laterally through an end portion of the second actuator shaft 320 to define the second end portion 308. As shown in FIGS. 20 and 21, the actuator shaft 320 of the first end assembly 600 is longer than the actuator shaft 320 of the second end assembly 602. In other embodiments, the actuator shafts 320 are otherwise sized.

In some embodiments, the actuator shafts 320 are both centered about and movable along a longitudinal axis of extension, shown as axis 620. The actuator shafts 320 may be movable independent of one another. By way of example, the actuator shafts 320 may move in the same direction or in opposing directions. By way of another example, one actuator shaft 320 may move relative to the frame 310 while the other actuator shaft 320 remains stationary. The configuration illustrated in FIG. 20 may represent a fully extended configuration of the deck actuator 300 (i.e., where the deck actuator 300 is extended to the maximum allowable length). The configuration illustrated in FIG. 21 may represent a retracted configuration of the deck actuator 300 (i.e., where the deck actuator 300 is retracted to less than the maximum allowable length).

A stop, block, bumper, collar, or limiter, shown as shaft stop 322, is fixedly coupled to each actuator shaft 320. The shaft stops 322 each extend radially and laterally outward beyond the corresponding actuator shaft 320. A first shaft stop 322 is coupled to an end portion of the first actuator shaft 320 opposite the first end portion 304. A second shaft stop 322 is coupled to an end portion of the second actuator shaft 320 opposite the second end portion 308. The guide plate 312 of the first end assembly 600 is positioned between the first shaft stop 322 and the first end portion 304. The guide plate 312 of the second end assembly 602 is positioned between the second shaft stop 322 and the second end portion 308. Accordingly, the shaft stops 322 are both positioned between the guide plates 312.

Each shaft stop 322 forms one or more apertures or passages, shown as through holes 420, that each extend longitudinally through the shaft stop 322. Each through hole 420 is sized to receive one of the standoffs 314. The standoffs 314 extend through the through holes 420, guiding movement of the actuator shafts 320 along the axis 620 and limiting rotation of the actuator shafts 320.

The control section 302 includes a pair of stops, blocks, bumpers, collars, or limiters, shown as control stops 330, each belonging to one of the end assemblies 600 and 602. Each control stop 330 defines a passage, shown as shaft passage 334, that extends longitudinally therethrough. In the first end assembly 600, a control stop 330 is positioned between a guide plate 312 and a shaft stop 322, with the control stop 330 positioned farther in a first longitudinal direction than the shaft stop 322. An actuator shaft 320 coupled to the shaft stop 322 extends through the shaft passage 334 of the control stop 330, slidably coupling the control stop 330 to the actuator shaft 320. Engagement between the shaft stop 322 and the control stop 330 limits movement of the actuator shaft 320 in the first longitudinal direction, while permitting free movement of the actuator shaft 320 in an opposing second longitudinal direction.

The second end assembly 602 has a similar arrangement, but oriented in an opposing direction. In the second end assembly 602, a control stop 330 is positioned between a guide plate 312 and a shaft stop 322, with the control stop 330 positioned farther in the second longitudinal direction than the shaft stop 322. An actuator shaft 320 coupled to the shaft stop 322 extends through the shaft passage 334 of the control stop 330, slidably coupling the control stop 330 to the actuator shaft 320. Engagement between the shaft stop 322 and the control stop 330 limits movement of the actuator shaft 320 in the second longitudinal direction, while permitting free movement of the actuator shaft 320 in the first longitudinal direction.

Referring to FIGS. 19-23, a rotational actuator assembly (e.g., an electric actuator assembly, a hydraulic motor assembly, a pneumatic motor assembly, etc.), shown as actuator 630, is coupled to the frame 310 and the control stops 330. The actuator 630 may be operatively coupled to and controlled by the controller 110. Similar to the actuator 332, the actuator 630 may control the position of the control stops 330 relative to the frame 310 by moving the control stops 330 longitudinally relative to the frame 310. The actuator 630 may selectively limit (e.g., prevent) movement of the control stops 330 relative to the frame 310.

The actuator 630 includes a rotational linkage assembly, shown as control linkage 640, coupled to the control stops 330. The control linkage 640 includes a pair of plates, discs, or rotating members, shown as drive wheel 642 and driven wheel 644. The drive wheel 642 and the driven wheel 644 are laterally offset from one another and positioned between the support plate 610 and the support plate 612. The drive wheel 642 and the driven wheel 644 are rotatably coupled to the frame 310 by a shaft, shown as support shaft 646. The support shaft 646 extends laterally across the frame 310. A first end portion of the support shaft 646 is rotatably coupled to the support plate 610 by a rotational support (e.g., a bearing, a bushing, etc.), shown as bearing 648, and a second end portion of the support shaft 646 is rotatably coupled to the support plate 612 by the transmission 690.

The drive wheel 642 and the driven wheel 644 may be rotatable relative to the frame 310 about an axis of rotation, shown as axis 650, that extends laterally and is centered about the support shaft 646. In some embodiments, the drive wheel 642 and the driven wheel 644 are fixedly coupled to the support shaft 646 (e.g., through welding), to transfer torque between the drive wheel 642 and the driven wheel 644 and maintain a common rotational orientation of the drive wheel 642 and the driven wheel 644 about the axis 650. By way of example, if the drive wheel 642 rotates 20 degrees clockwise, the driven wheel 644 may also rotate 20 degrees clockwise.

The control linkage 640 includes a first pair of linkage members, shown as links 660, that belong to the first end assembly 600. The links 660 couple the control stop 330 of the first end assembly 600 to the drive wheel 642 and the driven wheel 644. Specifically, a first link 660 is pivotally coupled to the control stop 330 and the drive wheel 642, and a second link 660 is pivotally coupled to the control stop 330 and the driven wheel 644. By way of example, each link 660 may define (a) a first passage that receives a pin to rotatably couple the link 660 to the control stop 330 and (b) a second passage that receives a pin to rotatably couple the link 660 to the drive wheel 642 or the driven wheel 644. The links 660 are pivotable relative to the control stop 330 about a first lateral axis of rotation, shown as axis 662. The links 660 are pivotable relative to the drive wheel 642 and the driven wheel 644 about a second lateral axis of rotation, shown as axis 664.

The control linkage 640 includes a second pair of linkage members, shown as links 670, that belong to the second end assembly 602. The links 670 couple the control stop 330 of the second end assembly 600 to the drive wheel 642 and the driven wheel 644. Specifically, a first link 670 is pivotally coupled to the control stop 330 and the drive wheel 642, and a second link 670 is pivotally coupled to the control stop 330 and the driven wheel 644. By way of example, each link 670 may define (a) a first passage that receives a pin to rotatably couple the link 670 to the control stop 330 and (b) a second passage that receives a pin to rotatably couple the link 670 to the drive wheel 642 or the driven wheel 644. The links 670 are pivotable relative to the control stop 330 about a first lateral axis of rotation, shown as axis 672. The links 670 are pivotable relative to the drive wheel 642 and the driven wheel 644 about a second lateral axis of rotation, shown as axis 674.

The actuator 630 includes a motor (e.g., an electric motor, a hydraulic motor, etc.), shown as electric motor 440, that drives rotation of the drive wheel 642 to control the positions of the control stops 330. The electric motor 440 is coupled to a gearbox, power transmission, driveline, or gear train, shown as transmission 690. The transmission 690 may include one or more gears or other power transmission members that transfer rotational mechanical energy from the electric motor 440 to an output member, shown as pinion gear 692. The pinion gear 692 is in engagement with the drive wheel 642, linking rotation of the pinion gear 692 and the drive wheel 642. By way of example, the pinion gear 692 may include external gear teeth in meshing engagement with corresponding external gear teeth on the drive wheel 642. Accordingly, rotation of the electric motor 440 causes a corresponding rotation of the drive wheel 642. The transmission 690 may include components (e.g., gears) that reduce an output speed of the pinion gear 692 and increase an output torque of the pinion gear 692 relative to that of the electric motor 440. Similarly, the pinion gear 692 may be smaller in diameter than the drive wheel 642 to reduce the speed of the drive wheel 642 and increase a torque on the drive wheel 642.

During operation, the electric motor 440 causes rotation of the drive wheel 642 and the driven wheel 644. This rotation pulls or pushes the links 660 and the links 670, which in turn cause movement of the control stops 330 along the axis 620. Specifically, rotation of the drive wheel 642 and the driven wheel 644 clockwise as shown in FIGS. 20 and 21 causes the control stops 330 to move toward one another. Rotation of the drive wheel 642 and the driven wheel 644 counterclockwise as shown in FIGS. 20 and 21 causes the control stops 330 to move away from one another. Accordingly, the controller 110 may control the positions of the control stops 330 by controlling rotation of the electric motor 440 (e.g., by changing a voltage, current, frequency, and/or polarity of electrical energy supplied to the electric motor 440).

As shown in FIGS. 20 and 21, the control linkage 640 includes a protrusion or registration member, shown as sensor bumper 700, that is fixedly coupled to the driven wheel 644. As shown, the sensor bumper 700 is formed as a single continuous piece with the driven wheel 644. In other embodiments, the sensor bumper 700 is otherwise coupled to the driven wheel 644 (e.g., indirectly through the drive wheel 642 and the support shaft 646). The sensor bumper 700 is radially offset from the axis 650, such that the sensor bumper 700 is movable between (a) a first position shown in FIG. 20 and (b) a second position shown in FIG. 21. Due to the connections of the links 660 and 670, the position of the sensor bumper 700 corresponds to the positions of the control stops 330. Specifically, the position shown in FIG. 20 corresponds to the fully extended positions of the control stops 330, and the position shown FIG. 21 corresponds to retracted positions or travel positions of the control stops 330.

The deck actuator 300 includes a retraction sensor 340 and an extension sensor 342, each coupled to the frame 310. The retraction sensor 340 and the extension sensor 342 are positioned to contact the sensor bumper 700. Specifically, the retraction sensor 340 is positioned to contact the sensor bumper 700 when the control stops 330 are in the travel positions. The extension sensor 342 is positioned to contact the sensor bumper 700 when the control stops 330 are in the fully extended positions. In other embodiments, the deck actuator 300 includes a different type of sensor. By way of example, the retraction sensor 340 may include a rotary potentiometer coupled to the frame 310 and the driven wheel 644.

Figure 24:
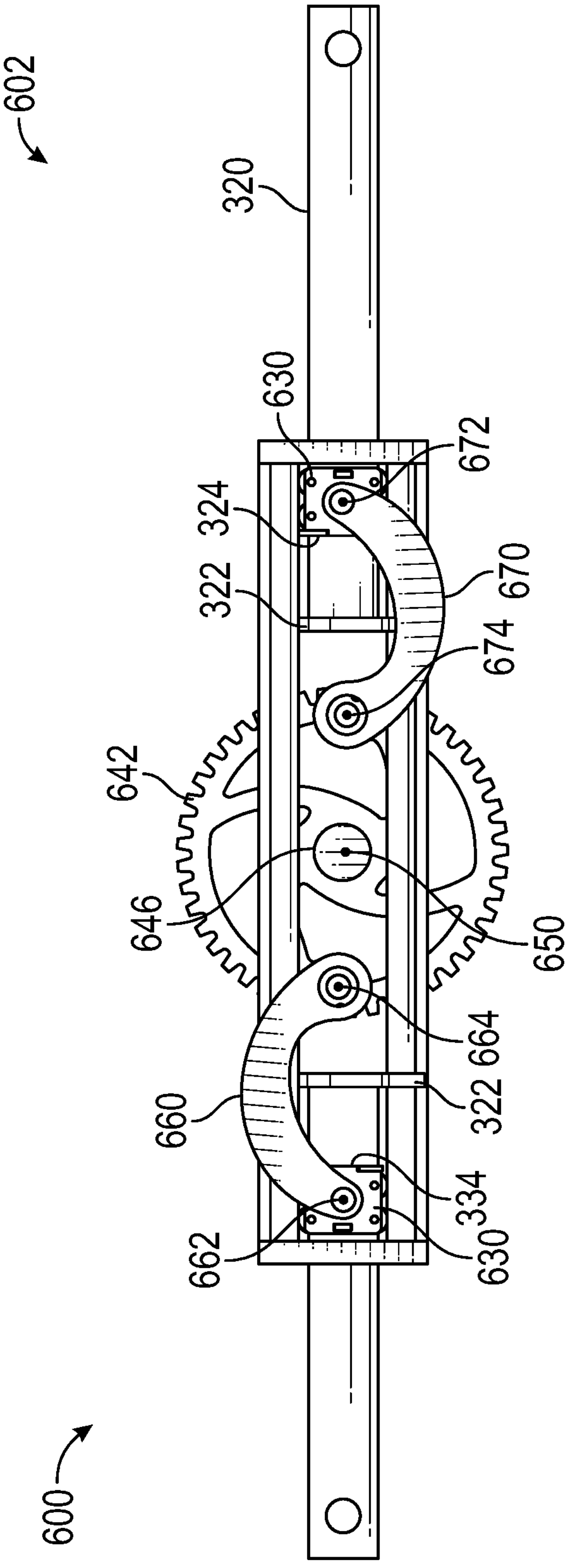
FIGS. 24, 25, 26, and 27 are front views of the mower deck actuator of FIG. 17 at various stages of operation.

Referring to FIGS. 24-27, the deck actuator 300 is shown at various stages of operation. The driven wheel 644 is omitted from FIGS. 24-27 for case of illustration. In operation, the actuator 332 varies the positions of the control stops 330 along the axis 620. In FIG. 24, the control stops 330 are shown in a fully extended configuration (i.e., each control stop 330 is at an extended end of its range of motion). In the fully extended configuration, the sensor bumper 700 engages the extension sensor 342 (as shown in FIG. 20), and the extension sensor 342 may provide a signal to the controller 110 indicating the positions of the control stops 330. In response to receiving this signal, the controller 110 may stop the actuator 630 from moving the control stops 330 further in the extension directions (e.g., by preventing further counterclockwise rotation of the drive wheel 642). As shown in FIG. 24, the shaft stops 322 are offset from the respective control stops, permitting movement of each actuator shaft 320 in both a retraction direction and an extension direction. Accordingly, FIG. 24 may represent a floating configuration of the deck actuator 300.

Figure 25:
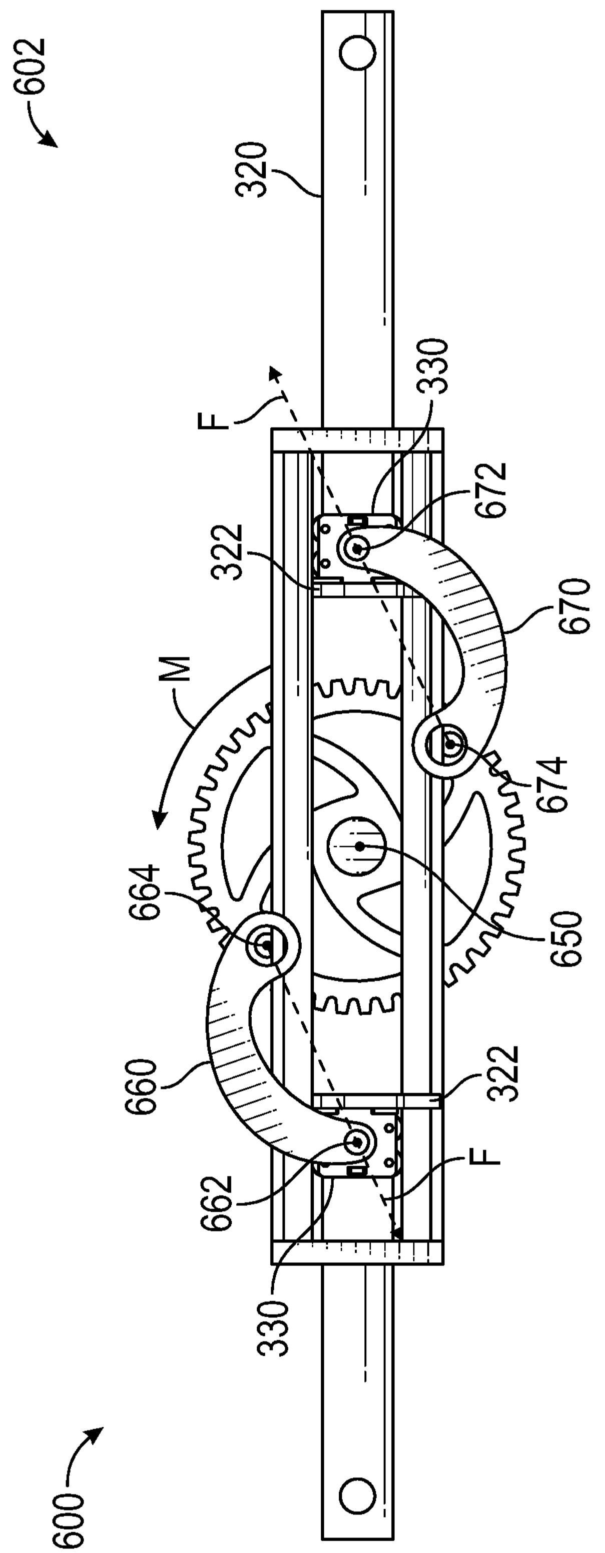

In FIG. 25, the drive wheel 642 is rotated clockwise, retracting both of the control stops 330 inward. The shaft stops 322 each engage one of the control stops 330, limiting outward movement of the actuator shafts 320. In order to counteract an outward or extending force on the actuator shafts 320 (e.g., caused by gravity acting on a mower deck 80), the links 660 and 670 apply an opposing force on the control stops 330, placing the links 660 and 670 in tension. The links 660 impart a force F on the drive wheel 642, the force F acting along a direction intersecting the axis 662 and the axis 664. The links 670 impart a force F on the drive wheel 642, the force F acting along a line intersecting the axis 672 and the axis 674. Due to the positions of the links 660 and 670 relative to the axis 650, these forces F impart a resultant moment or torque, shown as moment M, acting in a positive direction (i.e., counterclockwise) on the drive wheel 642. Accordingly, the electric motor 440 may apply a torque or moment in a negative direction to hold the positions of the control stops 330 or further retract the control stops 330.

Figure 26:
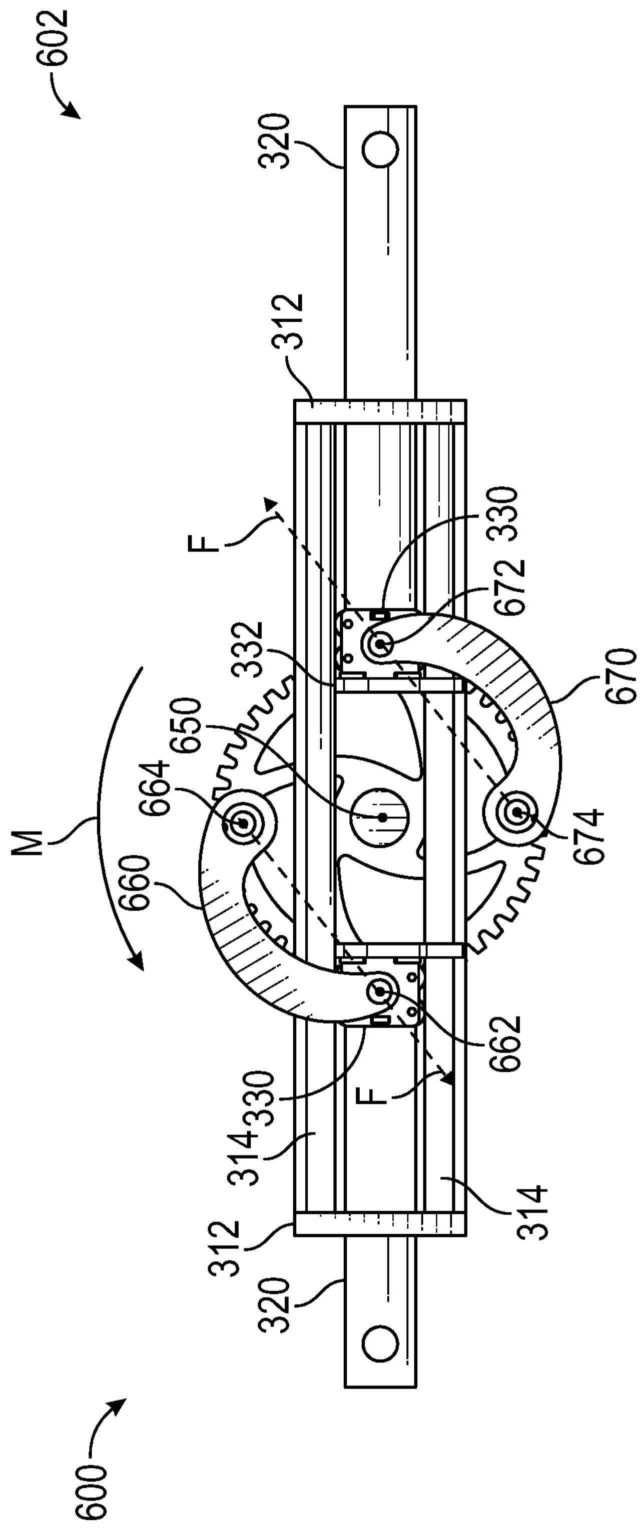

In FIG. 26, the drive wheel 642 is rotated further clockwise, retracting both of the control stops 330 further inward. The shaft stops 322 each engage one of the control stops 330, limiting outward movement of the actuator shafts 320. The links 660 and 670 continue to apply a retracting force on the control stops 330, placing the links 660 and 670 in tension. The links 660 impart a force F on the drive wheel 642, and the links 670 impart a force F on the drive wheel 642. Due to the positions of the links 660 and 670 relative to the axis 650, the moment M resultant from the forces F continues to act in a positive direction (i.e., counterclockwise) on the drive wheel 642. Accordingly, the electric motor 440 applies a torque or moment in a negative direction to hold the positions of the control stops 330 or further retract the control stops 330.

As the drive wheel 642 is rotated further clockwise beyond the configuration of FIG. 26, the drive wheel 642 reaches a centered position or centered configuration. The centered configuration may represent a fully retracted configuration, in which the control stops 330 have reached their most inward position. In the centered configuration, the axes 650, 662, 664, 672, and 674 may all be intersected by one line (e.g., the axis 620). Accordingly, the forces F both act along a line intersecting the axis 650, and the resultant moment M from the forces F is negligible.

Figure 27:
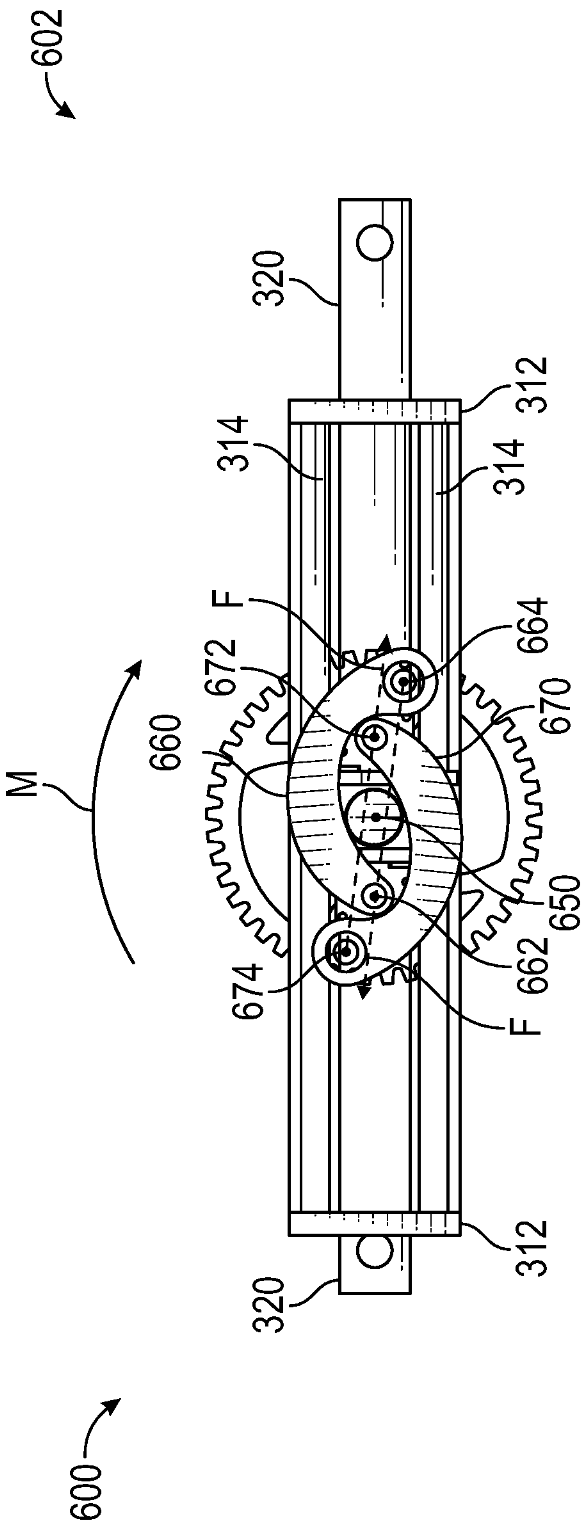

In FIG. 27, the drive wheel 642 is rotated further clockwise beyond the centered configuration. Accordingly, FIG. 27 represents an over center configuration of the control linkage 640. The over center configuration may also be considered a travel configuration, in which the mower deck 80 is held at the travel height. In the over center configuration, the control stops 330 may be extended slightly outward relative to the centered configuration. As shown, the shaft stops 322 each engage one of the control stops 330, limiting outward movement of the actuator shafts 320. The links 660 and 670 continue to apply a retracting force on the control stops 330, placing the links 660 and 670 in tension. The links 660 impart a force F on the drive wheel 642, and the links 670 impart a force F on the drive wheel 642. However, in the over center configuration, the forces F are applied on an opposite side of the axis 650 relative to the configurations of FIGS. 25 and 26. Accordingly, the moment M resultant from the forces F acts in a negative direction (i.e., clockwise) on the drive wheel 642. However, the links 660 and 670 contact one another and/or the support shaft 646 in the over center configuration, acting as a hard stop and preventing further rotation in the clockwise direction. An extending force on the actuator shafts 320 (e.g., from the weight of the mower deck 80) further loads against the hard stop, holding the control linkage 640 in the over center configuration. Accordingly, the control linkage 640 can remain in the over center configuration without application of a torque by the electric motor 440. By utilizing the over center configuration, the mower deck 80 can be held in the elevated travel position mechanically, without continuous application of electrical energy.

To lower the mower deck 80, the process shown in FIGS. 24-27 may be followed in reverse. The electric motor 440 may apply a torque to move the drive wheel 642 toward the center position. Once past the center position, the moment M acts in a positive direction. Accordingly, the mower deck 80 may be lowered by deactivating the electric motor 440 and permitting gravity to draw the mower deck 80 downward and extend the deck actuator 300.

As utilized herein with respect to numerical ranges, the terms “approximately,” “about,” “substantially,” and similar terms generally mean +/−10% of the disclosed values, unless specified otherwise. As utilized herein with respect to structural features (e.g., to describe shape, size, orientation, direction, relative position, etc.), the terms “approximately,” “about,” “substantially,” and similar terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term “exemplary” and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the figures. It should be noted that the orientation of various elements may differ according to other exemplary embodiments, and that such variations are intended to be encompassed by the present disclosure.

The hardware and data processing components used to implement the various processes, operations, illustrative logics, logical blocks, modules, and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems, and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the mower 10 and the systems and components thereof (e.g., the body 20, the operator controls 40, the driveline 50, the suspension system 60, the braking system 70, the control system 100, etc.) as shown in the various exemplary embodiments is illustrative only. Additionally, any element disclosed in one embodiment may be incorporated or utilized with any other embodiment disclosed herein. By way of example, the transmission 500 may be utilized with the deck actuator 300 of FIG. 7 in place of the transmission 450.

The invention claimed is:

1. A mower, comprising:
- a chassis;
- a tractive element coupled to the chassis;
- a mower deck coupled to the chassis and including a cutting element; and
- a deck actuator assembly configured to raise the mower deck relative to the chassis, the deck actuator assembly including:
  - a frame;
  - a first actuator shaft coupled to the mower deck and slidably coupled to the frame;
  - a second actuator shaft coupled to the chassis and slidably coupled to the frame;
  - a stop slidably coupled to the first actuator shaft and configured to (a) limit movement of the first actuator shaft in a first direction and (b) permit movement of the first actuator shaft in a second direction opposite the first direction; and an actuator configured to reposition the stop relative to the frame.

2. The mower of claim 1, wherein the stop is a first stop, wherein the deck actuator assembly further includes a second stop slidably coupled to the second actuator shaft and configured to (a) limit movement of the second actuator shaft in the second direction and (b) permit movement of the second actuator shaft in the first direction.

3. The mower of claim 2, wherein the actuator is configured to reposition both the first stop and the second stop relative to the frame.

4. The mower of claim 3, wherein the actuator is configured to move the first stop in the second direction and move the second stop in the first direction.

5. The mower of claim 1, wherein the actuator includes an electric motor configured to move the stop in the second direction to raise the mower deck to a travel position, and wherein the actuator is configured to hold the mower deck in the travel position without supplying electrical energy to the electric motor.

6. The mower of claim 1, wherein movement of the first actuator shaft toward the second actuator shaft raises the mower deck, and wherein movement of the first actuator shaft away from the second actuator shaft lowers the mower deck.

7. A mower, comprising:

a chassis;

a mower deck coupled to the chassis and including a cutting element; and a deck actuator assembly configured to raise the mower deck relative to the chassis, the deck actuator assembly including:

an output interface coupled to the chassis;

a frame coupled to the output interface;

an actuator shaft coupled to the mower deck and slidably coupled to the frame;

a control stop positioned to (a) limit movement of the actuator shaft in a first longitudinal direction and (b) permit movement of the actuator shaft in a second longitudinal direction opposite the first longitudinal direction;

a rotating member rotatably coupled to the frame; and a link rotatably coupled to the control stop and the rotating member, wherein rotation of the rotating member causes a corresponding longitudinal movement of the control stop.

8. The mower of claim 7, wherein the actuator shaft is a first actuator shaft and the control stop is a first control stop, and wherein the deck actuator assembly further includes:

a second actuator shaft slidably coupled to the frame and defining the output interface; and a second control stop positioned to limit movement of the second actuator shaft in the second longitudinal direction.

9. The mower of claim 8, wherein the link is a first link, and wherein the deck actuator assembly further includes a second link rotatably coupled to the second control stop and the rotating member.

10. The mower of claim 9, wherein rotation of the rotating member in a first direction causes the first control stop to move in the second longitudinal direction and the causes the second control stop to move in the first longitudinal direction.

11. The mower of claim 7, wherein the deck actuator assembly further includes a motor configured to drive rotation of the rotating member.

12. The mower of claim 11, wherein the deck actuator assembly further includes a gear coupled to the motor, and wherein the rotating member includes gear teeth in engagement with the gear.

13. The mower of claim 11, further comprising:

a sensor coupled to the frame and configured to provide sensor data indicating a position of the rotating member; and a controller operatively coupled to the motor and the sensor and configured to limit operation of the motor based on the sensor data.

14. The mower of claim 13, further comprising a protrusion coupled to the rotating member, wherein the sensor is configured to detect the presence of the protrusion in a predetermined position.

15. The mower of claim 7, wherein the actuator shaft extends through an aperture defined by the control stop, and wherein a shaft stop coupled to the actuator shaft is configured to engage the control stop to limit the movement of the actuator shaft in the first longitudinal direction.

16. The mower of claim 15, wherein the aperture is a first aperture, wherein the frame includes a guide defining a second aperture that receives the actuator shaft.

17. The mower of claim 16, further comprising a standoff coupled to the frame, wherein the standoff engages the shaft stop to limit rotation of the actuator shaft.

18. A floating linear actuator comprising:

a frame defining a first shaft passage and a second shaft passage;

a first actuator shaft extending through the first shaft passage;

a second actuator shaft extending through the second shaft passage;

a first control stop movable relative to the frame and the first actuator shaft;

a second control stop movable relative to the frame and the second actuator shaft; and a linkage including:

a rotating member rotatably coupled to the frame;

a first link coupling the first control stop to the rotating member; and a second link coupling the second control stop to the rotating member, wherein rotation of the rotating member both (a) repositions the first control stop relative to the frame to limit a longitudinal range of motion of the first actuator shaft and (b) repositions the second control stop relative to the frame to limit a longitudinal range of motion of the second actuator shaft.

19. The floating linear actuator of claim 18, wherein the rotating member is configured to rotate relative to the frame about a first lateral axis, wherein the first link is configured to rotate relative to the rotating member about a second lateral axis, and wherein the second link is configured to rotate relative to the rotating member about a third lateral axis.

20. The floating linear actuator of claim 19, wherein the linkage is reconfigurable into an over center configuration in which the linkage (a) prevents movement of the first control stop away from the second control stop in response to an external force on the first actuator shaft and (b) permits movement of the first control stop away from the second control stop in response to a torque on the rotating member.

* * * * *